US010503988B2

(12) United States Patent
Cordell et al.

(10) Patent No.: US 10,503,988 B2
(45) Date of Patent: Dec. 10, 2019

(54) METHOD AND APPARATUS FOR PROVIDING GOAL ORIENTED NAVIGATIONAL DIRECTIONS

(71) Applicant: Xevo Inc., Bellevue, WA (US)

(72) Inventors: John Palmer Cordell, Los Angeles, CA (US); Robert Victor Welland, Seattle, WA (US); Samuel James McKelvie, S. Seattle, WA (US); John Hayes Ludwig, Bellevue, WA (US)

(73) Assignee: Xevo Inc., Bellevue, WA (US)

( * ) Notice: Subject to any disclaimer, the term of this patent is extended or adjusted under 35 U.S.C. 154(b) by 203 days.

(21) Appl. No.: 15/673,909

(22) Filed: Aug. 10, 2017

(65) Prior Publication Data

US 2018/0047288 A1 Feb. 15, 2018

Related U.S. Application Data

(60) Provisional application No. 62/372,999, filed on Aug. 10, 2016.

(51) Int. Cl.
*G06K 9/00* (2006.01)
*H04W 4/44* (2018.01)
(Continued)

(52) U.S. Cl.
CPC ......... *G06K 9/00845* (2013.01); *B60Q 9/008* (2013.01); *B60R 1/00* (2013.01);
(Continued)

(58) Field of Classification Search
CPC .. G06K 9/00845; G06K 9/00; G06K 9/00281; G06K 9/00604; G06K 9/00791;
(Continued)

(56) References Cited

U.S. PATENT DOCUMENTS 7,119,832 B2 * 10/2006 Blanco ............... G08B 13/1672
348/148
8,593,301 B2 * 11/2013 Newman ............. G08G 1/0965
340/902
(Continued)

FOREIGN PATENT DOCUMENTS

JP 2009146086 A 7/2009
JP 2016057959 A 4/2016
(Continued)

*Primary Examiner* — Courtney D Heinle

(57) ABSTRACT

A method or system is able to refine Global Positioning System ("GPS") information for guiding a vehicle via extracted metadata using a GPS refinement ("GR") model managed by a virtuous cycle containing sensors, machine learning center ("MLC"), and a cloud based network ("CBN"). The GR system includes a set of outward facing cameras, a vehicle onboard computer ("VOC"), and GR model. The outward facing cameras mounted on a vehicle are capable of collecting external images representing a surrounding environment in which the vehicle operates. The VOC is configured to generate a positional vehicle location with respect to the surrounding environment in accordance with the external images and historical stored data obtained from CBN. The GR model is configured to generate a driving guidance based on combined information between the positional vehicle location and GPS data.

9 Claims, 19 Drawing Sheets

(51) Int. Cl.

| | | |
|---|---|---|
| *B60Q 9/00* | (2006.01) | |
| *B60R 1/00* | (2006.01) | |
| *B60R 1/04* | (2006.01) | |
| *B60R 1/062* | (2006.01) | |
| *G01C 21/36* | (2006.01) | |
| *G01S 19/48* | (2010.01) | |
| *G06K 9/66* | (2006.01) | |
| *G08G 1/01* | (2006.01) | |
| *G08G 1/04* | (2006.01) | |
| *G08G 1/0968* | (2006.01) | |
| *G08G 1/0969* | (2006.01) | |
| *G08G 1/14* | (2006.01) | |
| *G08G 1/16* | (2006.01) | |
| *H04L 29/08* | (2006.01) | |
| *H04N 7/18* | (2006.01) | |
| *H04W 4/02* | (2018.01) | |
| *G06N 10/00* | (2019.01) | |
| *G05D 1/02* | (2006.01) | |
| *G06N 3/04* | (2006.01) | |
| *G06N 3/08* | (2006.01) | |
| *G06N 20/00* | (2019.01) | |

(52) U.S. Cl.
CPC .............. *B60R 1/04* (2013.01); *B60R 1/062* (2013.01); *G01C 21/3602* (2013.01); *G01C 21/3605* (2013.01); *G01S 19/48* (2013.01); *G06K 9/00281* (2013.01); *G06K 9/00604* (2013.01); *G06K 9/00791* (2013.01); *G06K 9/00798* (2013.01); *G06K 9/00805* (2013.01); *G06K 9/00812* (2013.01); *G06K 9/00832* (2013.01); *G06K 9/00979* (2013.01); *G06K 9/66* (2013.01); *G08G 1/0112* (2013.01); *G08G 1/0116* (2013.01); *G08G 1/0129* (2013.01); *G08G 1/04* (2013.01); *G08G 1/0969* (2013.01); *G08G 1/096811* (2013.01); *G08G 1/096861* (2013.01); *G08G 1/096888* (2013.01); *G08G 1/143* (2013.01); *G08G 1/166* (2013.01); *H04L 67/10* (2013.01); *H04N 7/188* (2013.01); *H04W 4/02* (2013.01); *H04W 4/44* (2018.02); *B60R 2300/105* (2013.01); *B60R 2300/8006* (2013.01); *G05D 1/0214* (2013.01); *G05D 1/0246* (2013.01); *G06K 2209/27* (2013.01); *G06N 3/0454* (2013.01); *G06N 3/08* (2013.01); *G06N 20/00* (2019.01)

(58) Field of Classification Search
CPC ........... G06K 9/00798; G06K 9/00805; G06K 9/00812; G06K 9/00832; G06K 9/00979; G06K 9/66; G06K 2209/27; H04W 4/44; H04W 4/02; B60Q 9/008; B60R 1/00; B60R 1/04; B60R 1/062; B60R 2300/105; B60R 2300/8006; G01C 21/3602; G01C 21/3605; G01S 19/48; G08G 1/0112; G08G 1/0116; G08G 1/0129; G08G 1/04; G08G 1/096811; G08G 1/096861; G08G 1/096888; G08G 1/0969; G08G 1/143; G08G 1/166; H04L 7/188; G06N 20/00; G05D 1/0214; G05D 1/0246
See application file for complete search history.

(56) References Cited

U.S. PATENT DOCUMENTS

| | | | | |
|---|---|---|---|---|
| 10,001,376 | B1 * | 6/2018 | Tiana | G01C 21/005 |
| 2008/0186210 | A1 * | 8/2008 | Tseng | G01C 21/3602 |
| | | | | 340/995.26 |
| 2010/0185390 | A1 * | 7/2010 | Monde | G01C 21/26 |
| | | | | 701/532 |
| 2011/0313593 | A1 * | 12/2011 | Cohen | G01S 5/0027 |
| | | | | 701/2 |
| 2015/0054934 | A1 * | 2/2015 | Haley | G06K 9/00845 |
| | | | | 348/78 |
| 2015/0073664 | A1 * | 3/2015 | Petridis | G08G 1/16 |
| | | | | 701/41 |
| 2016/0040998 | A1 * | 2/2016 | Ricci | H04W 4/21 |
| | | | | 701/431 |
| 2016/0065903 | A1 * | 3/2016 | Wang | B60R 11/04 |
| 2017/0174227 | A1 * | 6/2017 | Tatourian | G06K 9/00805 |
| 2018/0012497 | A1 * | 1/2018 | Penilla | G05D 1/0011 |
| 2018/0357484 | A1 * | 12/2018 | Omata | G08G 1/00 |

FOREIGN PATENT DOCUMENTS

| | | |
|---|---|---|
| KR | 1020150137264 A | 12/2015 |
| WO | 2013005912 A1 | 1/2013 |

\* cited by examiner

METHOD AND APPARATUS FOR PROVIDING GOAL ORIENTED NAVIGATIONAL DIRECTIONS

PRIORITY

This application claims the benefit of priority based upon U.S. Provisional Patent Application having an application Ser. No. 62/372,999, filed on Aug. 10, 2016, and having a title of "Method and System for Providing Information Using Collected and Stored Metadata," which is hereby incorporated by reference in its entirety.

RELATED APPLICATION

This application is related to the following co-pending application assigned to the Assignee of the present invention.

a. Application Ser. No. 15/672,747, filed Aug. 9, 2017, entitled "Method and Apparatus for Providing Information via Collected and Stored Metadata Using Inferred Attentional Model," invented by the same inventors;

b. Application Ser. No. 15/672,832, filed Aug. 9, 2017, entitled "Method and Apparatus for Providing Driver Information Via Audio and Video Metadata Extraction," invented by the same inventors; and c. Application Ser. No. 15/672,897, filed Aug. 9, 2017, entitled "Method and Apparatus for Providing Automatic Mirror Setting via Inward Facing Cameras" invented by the same inventors.

FIELD

The exemplary embodiment(s) of the present invention relates to the field of communication networks. More specifically, the exemplary embodiment(s) of the present invention relates to operating an intelligent machine using a virtuous cycle between cloud, machine learning, and containerized sensors.

BACKGROUND

With increasing popularity of automation and intelligent electronic devices, such as computerized machines, IoT (the Internet of Things), smart vehicles, smart phones, drones, mobile devices, airplanes, artificial intelligence ("AI"), the demand of intelligent machines and faster real-time response are increasing. To properly provide machine learning, a significant number of pieces, such as data management, model training, and data collection, needs to be improved.

A conventional type of machine learning is, in itself, an exploratory process which may involve trying different kinds of models, such as convolutional, RNN (recurrent neural network), et cetera. Machine learning or training typically concerns a wide variety of hyper-parameters that change the shape of the model and training characteristics. Model training generally requires intensive computation. As such, real-time response via machine learning model can be challenging.

A drawback associated to a conventional navigation system is that it provides turn by turn and specific lane instructions without sufficiently high resolution to determine which lane the car is currently in. Another drawback with a typical GPS (global positioning system) navigational system is that the raw GPS usually has wide variance and errors, particularly in urban areas. Another problem with current navigation systems is that their goal is to give the driver directions to the specified address without any information about where to park the vehicle. For example, it is frequently the case that the goal is not to get the car to the exact address because a more practical goal is to park the car as near the address as possible and then have the driver can walk to the specified address.

SUMMARY

One embodiment of the presently claimed invention discloses a method or system capable of refining Global Positioning System ("GPS") information for guiding a vehicle via extracted metadata using a GPS refinement ("GR") model managed by a virtuous cycle containing sensors, machine learning center ("MLC"), and a cloud based network ("CBN"). The GR system includes a set of outward facing cameras, a vehicle onboard computer ("VOC"), and GR model. The outward facing cameras mounted on a vehicle are capable of collecting external images representing a surrounding environment in which the vehicle operates. For example, the external images include landmarks, road condition, number of lanes, and nearby building within the surrounding environment.

The VOC is configured to generate a positional vehicle location with respect to the surrounding environment in accordance with the external images and historical stored data obtained from CBN. In one example, the positional vehicle location is calculated based on historical data relating to the surrounding environment from CBN and GPS reading. The positional vehicle location can also be calculated based on database of surveyed road signage and navigational reading. In addition, the positional vehicle location is calculated in response to a computation of two optical rays from two external images captured by two different outward facing cameras. Also, the positional vehicle location is computed via a process of triangulation between a point in space and known survey location of current road.

The GR model, in one embodiment, is configured to generate a driving guidance based on combined information between the positional vehicle location and GPS data. The GR model can be hardware, software, or a combination of hardware and software that resides at least partially with the VOC. It should be noted that the driving guidance can indicate which lane the vehicle is currently on it. The GR system further includes inward facing cameras capable of capturing internal images relating to driver, passenger, and interior of the vehicle.

In another embodiment, a GR process for goal oriented navigational guidance via metadata extraction utilizing a virtuous cycle including sensors, MLC, and CBN is capable of detecting vehicle approaching to a preset destination in accordance with information obtained from a GPS navigation system. In one example, the process is able to determine whether the preset destination provides parking in accordance with historical data from CBN associated with the preset destination. The process activates at least a portion of outward facing cameras mounted to the vehicle for capturing external images representing a surrounding environment in which the vehicle operates. In one aspect, audio sensors are activated to record audio data from the surrounding environment in which the vehicle operates. The process obtains, from the virtuous cycle, information relating to parking options nearby the preset destination in accordance with present time, traffic condition, events, and walking condition. In one example, a suitable parking spot nearby the preset destination is received in accordance with street safety, whether condition, parking pricing, likelihood availability of find a parking, and neighborhood crime rate. The parking options are displayed via a parking compass of the GPS navigation system to inform driver potential location for parking. In one embodiment, the process is capable of presenting a probability of parking space on the parking compass based on which direction the vehicle turns. In one example, after changing predefined modalities set by the GPS navigation system to proceed looking for a nearby parking space based on direction shown by the parking compass, the GR model connected to the vehicle, MLC, and CBN is activated to generate a search path near the preset destination for parking space. It should be noted that the external images are uploaded from the VOC to the virtuous cycle via a wireless communication network.

In an alternative embodiment, the presently claimed invention discloses a process configured to manage crowd source data facilitated by a crowd source data ("CD") model coupled to a virtuous cycle containing sensors, MLC and CBN. In one aspect, after receiving an incentive message from a CD model requesting vehicle to pass through a location for collecting real-time video associated with the location, the process is capable of activating at least a portion of outward facing cameras mounted to the vehicle for capturing external real-time images representing a surrounding environment in which the vehicle passes through the location. Upon uploading the external real-time images to cloud based processors to process and categorize captured real-time video and image information for a geographic area including the location, a report describing monitoring record of the location is forwarded to a subscriber. Alternatively, the process is able to create a bid process for receiving incentives for driving through the location. Also, the CD model can reroute trips to cover the location in a regular basis.

Additional features and benefits of the exemplary embodiment(s) of the present invention will become apparent from the detailed description, figures and claims set forth below.

BRIEF DESCRIPTION OF THE DRAWINGS

The exemplary embodiment(s) of the present invention will be understood more fully from the detailed description given below and from the accompanying drawings of various embodiments of the invention, which, however, should not be taken to limit the invention to the specific embodiments, but are for explanation and understanding only.

DETAILED DESCRIPTION

Figure 1A:
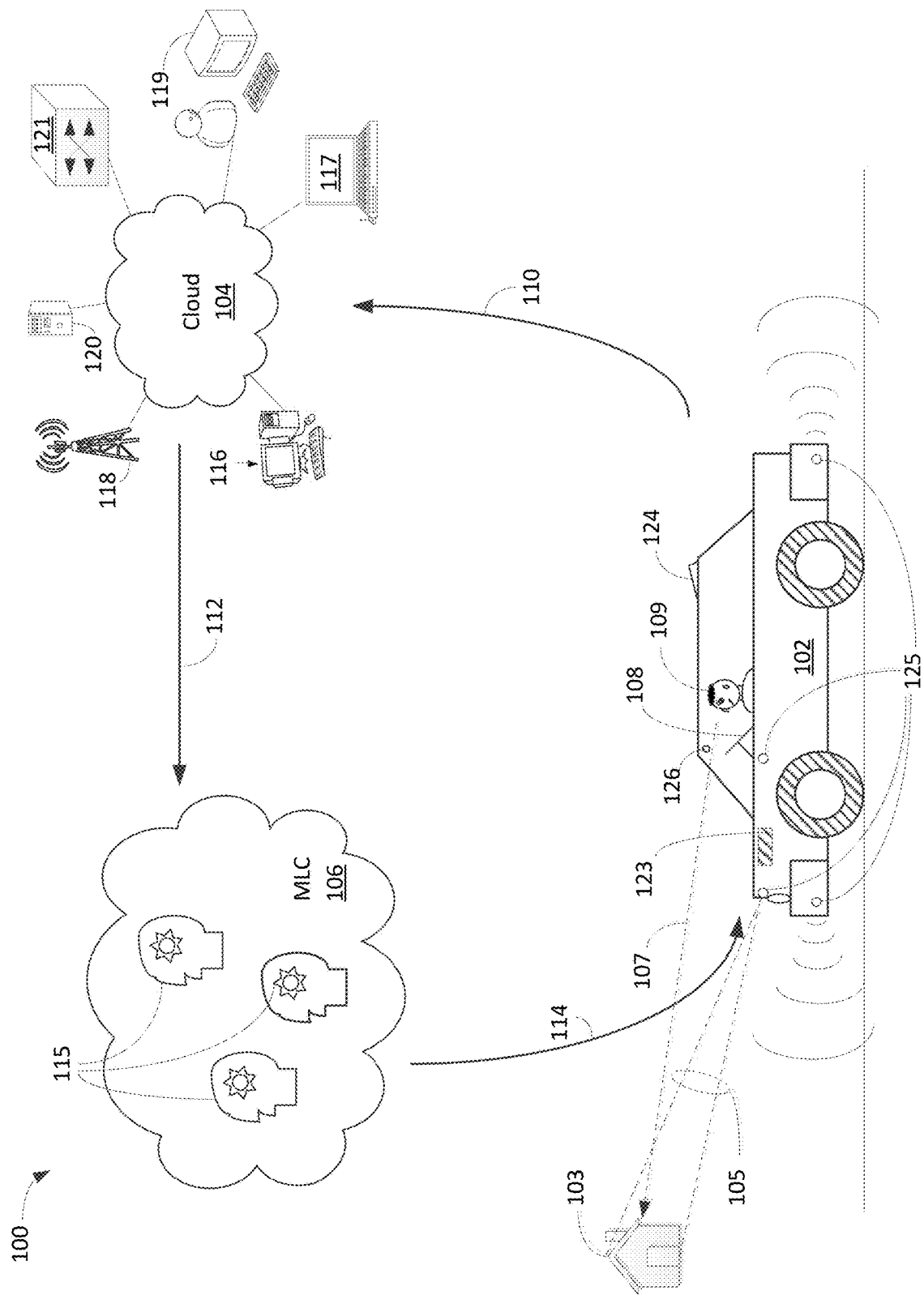
FIGS. 1A-1B are block diagrams illustrating a virtuous cycle facilitating GR system capable of refine GPS navigation guidance via a virtuous cycle in accordance with one embodiment of the present invention.

Embodiments of the present invention are described herein with context of a method and/or apparatus for refining GPS navigation guidance for a vehicle using outward facing cameras via a GR model continuously trained by a virtuous cycle containing cloud based network, containerized sensing device, and machine learning center ("MLC").

The purpose of the following detailed description is to provide an understanding of one or more embodiments of the present invention. Those of ordinary skills in the art will realize that the following detailed description is illustrative only and is not intended to be in any way limiting. Other embodiments will readily suggest themselves to such skilled persons having the benefit of this disclosure and/or description.

In the interest of clarity, not all of the routine features of the implementations described herein are shown and described. It will, of course, be understood that in the development of any such actual implementation, numerous implementation-specific decisions may be made in order to achieve the developer's specific goals, such as compliance with application- and business-related constraints, and that these specific goals will vary from one implementation to another and from one developer to another. Moreover, it will be understood that such a development effort might be complex and time-consuming, but would nevertheless be a routine undertaking of engineering for those of ordinary skills in the art having the benefit of embodiment(s) of this disclosure.

Various embodiments of the present invention illustrated in the drawings may not be drawn to scale. Rather, the dimensions of the various features may be expanded or reduced for clarity. In addition, some of the drawings may be simplified for clarity. Thus, the drawings may not depict all of the components of a given apparatus (e.g., device) or method. The same reference indicators will be used throughout the drawings and the following detailed description to refer to the same or like parts.

In accordance with the embodiment(s) of present invention, the components, process steps, and/or data structures described herein may be implemented using various types of operating systems, computing platforms, computer programs, and/or general purpose machines. In addition, those of ordinary skills in the art will recognize that devices of a less general purpose nature, such as hardware devices, field programmable gate arrays (FPGAs), application specific integrated circuits (ASICs), or the like, may also be used without departing from the scope and spirit of the inventive concepts disclosed herein. Where a method comprising a series of process steps is implemented by a computer or a machine and those process steps can be stored as a series of instructions readable by the machine, they may be stored on a tangible medium such as a computer memory device (e.g., ROM (Read Only Memory), PROM (Programmable Read Only Memory), EEPROM (Electrically Erasable Programmable Read Only Memory), FLASH Memory, Jump Drive, and the like), magnetic storage medium (e.g., tape, magnetic disk drive, and the like), optical storage medium (e.g., CD-ROM, DVD-ROM, paper card and paper tape, and the like) and other known types of program memory.

The term "system" or "device" is used generically herein to describe any number of components, elements, subsystems, devices, packet switch elements, packet switches, access switches, routers, networks, computer and/or communication devices or mechanisms, or combinations of components thereof. The term "computer" includes a processor, memory, and buses capable of executing instruction wherein the computer refers to one or a cluster of computers, personal computers, workstations, mainframes, or combinations of computers thereof.

One embodiment of the presently claimed invention discloses a method or system capable of refining Global Positioning System ("GPS") information for guiding a vehicle via extracted metadata using a GPS refinement ("GR") model managed by a virtuous cycle containing sensors, machine learning center ("MLC"), and a cloud based network ("CBN"). The GR system includes a set of outward facing cameras, a vehicle onboard computer ("VOC"), and GR model. The outward facing cameras mounted on a vehicle are capable of collecting external images representing a surrounding environment in which the vehicle operates. The VOC is configured to generate a positional vehicle location with respect to the surrounding environment in accordance with the external images and historical stored data obtained from CBN. The GR model is configured to generate a driving guidance based on combined information between the positional vehicle location and GPS data.

FIG. 1A is a block diagram 100 illustrating a virtuous cycle facilitating GR system capable of refine GPS navigation guidance via a virtuous cycle in accordance with one embodiment of the present invention. Diagram 100 illustrates a virtuous cycle containing a vehicle 102, CBN 104, and MLC 106. In one aspect, MCL 106 can be located remotely or in the cloud. Alternatively, MCL 106 can be a part of CBN 104. It should be noted that the underlying concept of the exemplary embodiment(s) of the present invention would not change if one or more blocks (circuit or elements) were added to or removed from diagram 100.

Vehicle 102, in one example, can be a car, automobile, bus, train, drone, airplane, truck, and the like, and is capable of moving geographically from point A to point B. To simplify forgoing discussing, the term "vehicle" or "car" is used. Vehicle 102 includes wheels with ABS (anti-lock braking system), body, steering wheel 108, exterior or outward facing cameras 125, interior (or 360° (degree)) or inward facing camera 126, antenna 124, onboard controller or VOC 123, and operator (or driver) 109. It should be noted that outward facing cameras and/or inward facing cameras 125-126 can be installed at front, side-facing, stereo, and inside of vehicle 102. In one example, vehicle 102 also includes various sensors which senses information related to vehicle state, vehicle status, driver actions, For example, the sensors, not shown in FIG. 1A, are able to collect information, such as audio, ABS, steering, braking, acceleration, traction control, windshield wipers, GPS (global positioning system), radar, ultrasound, lidar (Light Detection and Ranging), and the like.

VOC or onboard controller 123 includes CPU (central processing unit), GPU (graphic processing unit), memory, and disk responsible for gathering data from outward facing or exterior cameras 125, inward facing or interior cameras 126, audio sensor, ABS, traction control, steering wheel, CAN-bus sensors, and the like. In one aspect, VOC 123 executes GR model received from MLC 106, and interfaces with antenna 124 to communicate with CBN 104 via a wireless communication network 110. Note that wireless communication network includes, but not limited to, WIFI, cellular network, Bluetooth network, satellite network, or the like. A function of VOC 123 is to gather or capture real-time surrounding information as well as exterior information when vehicle 102 is moving.

CBN 104 includes various digital computing systems, such as, but not limited to, server farm 120, routers/switches 121, cloud administrators 119, connected computing devices 116-117, and network elements 118. A function of CBN 104 is to provide cloud computing which can be viewed as on-demand Internet based computing service with enormous computing power and resources. Another function of CBN 104 is to improve or refine GR labeled data via correlating captured real-time data with relevant cloud data. The refined GR labeled data is subsequently passed to MLC 106 for model training via a connection 112.

MLC 106, in one embodiment, provides, refines, trains, and/or distributes models 115 such as GR model based on information or data such as GR labeled data provided from CBN 104. It should be noted that the machine learning makes GR model based on models generated and maintained by various computational algorithms using historical data as well as current data. A function of MLC 106 is that it is capable of pushing information such as revised GR model to vehicle 102 via a wireless communications network 114 in real-time.

To identify or collect current operator driving style via vehicle 102, an onboard GR model which could reside inside of VOC 123 receives a triggering event or events from built-in sensors such as driver body language, external surrounding condition, internal detected images, ABS, wheel slippery, turning status, engine status, and the like. The triggering event or events may include, but not limited to, activation of ABS, texting, drinking, smoking, arguing, playing, fighting, rapid steering, rapid breaking, excessive wheel slip, activation of emergency stop, and on. Upon receiving triggering events via vehicular status signals, the recording or recorded images captured by inward facing camera or 360 camera are rewound from an earlier time stamp leading to the receipt of triggering event(s) for identifying, for example, GR labeled data which contains images of driver head position or abnormal events. After correlation of labeled data with historical sampling data at CBN, the GR model is retrained and refined at MLC 106. The retrained GR model is subsequently pushed back onto vehicle 102.

During an operation, outward facing cameras 125 capture external images such as landmarks, road(s), houses, radio tower(s), and the like. Upon uploading the external images to the cloud processing center, a more accurate physical location of vehicle is identified. Based on the refined GPS navigation information, the exact location of vehicle such as vehicle is in lane 2 is determined and proper guiding instruction can be provided, such as change to lane 1 or stay where it is.

An advantage of using GR system is to provide a more accurate and useful traffic guidance.

Figure 1B:
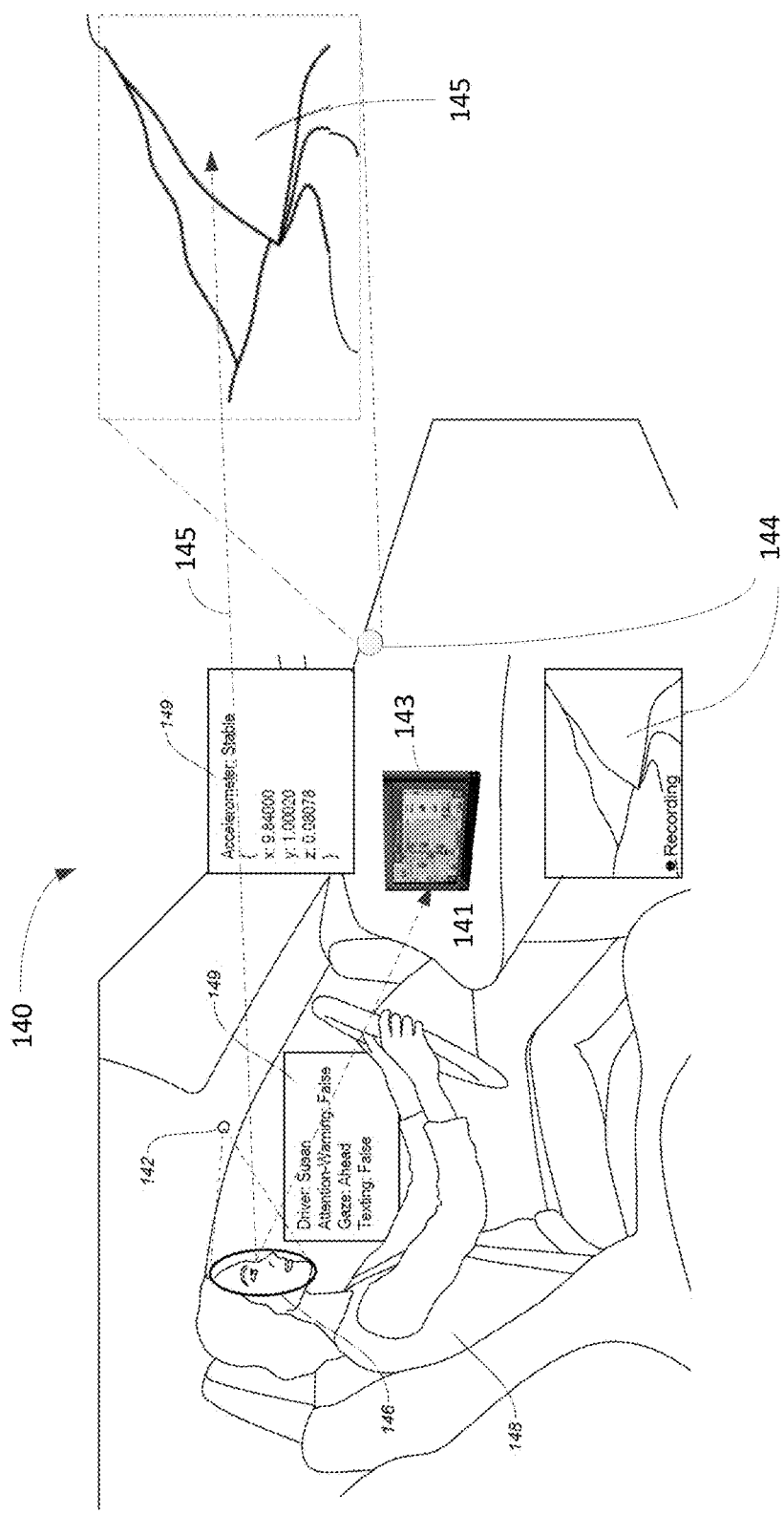

FIG. 1B illustrates a block diagram 140 showing an operator or driver monitored by GR system for displaying refined GPS navigation guidance via a virtuous cycle in accordance with one embodiment of the present invention. Diagram 140 illustrates a driver 148, inward facing camera(s) 142, navigation display 143, and exterior camera 144. In one aspect, camera 142, also known as interior camera or 360 camera, monitors or captures driver's facial expression 146 and/or driver (or operator) body language such as head position. Upon reading status 149 which indicates stable with accelerometer, ahead with gaze, hands on steering wheel (no texting), a model can conclude that driver is behaving normally or abnormally.

During an operation, the external images captured by outward facing camera(s) 144 can show a location in which operator 148 is focusing based on relative eye positions of operator 148. Upon uploading external images to the cloud, a vehicle location with respect to the road or lanes as shown in frame 145 is calculated. After combining the GPS data and the calculated or positional vehicle location, a refined GPS navigation guidance can be provided.

Figure 1C:
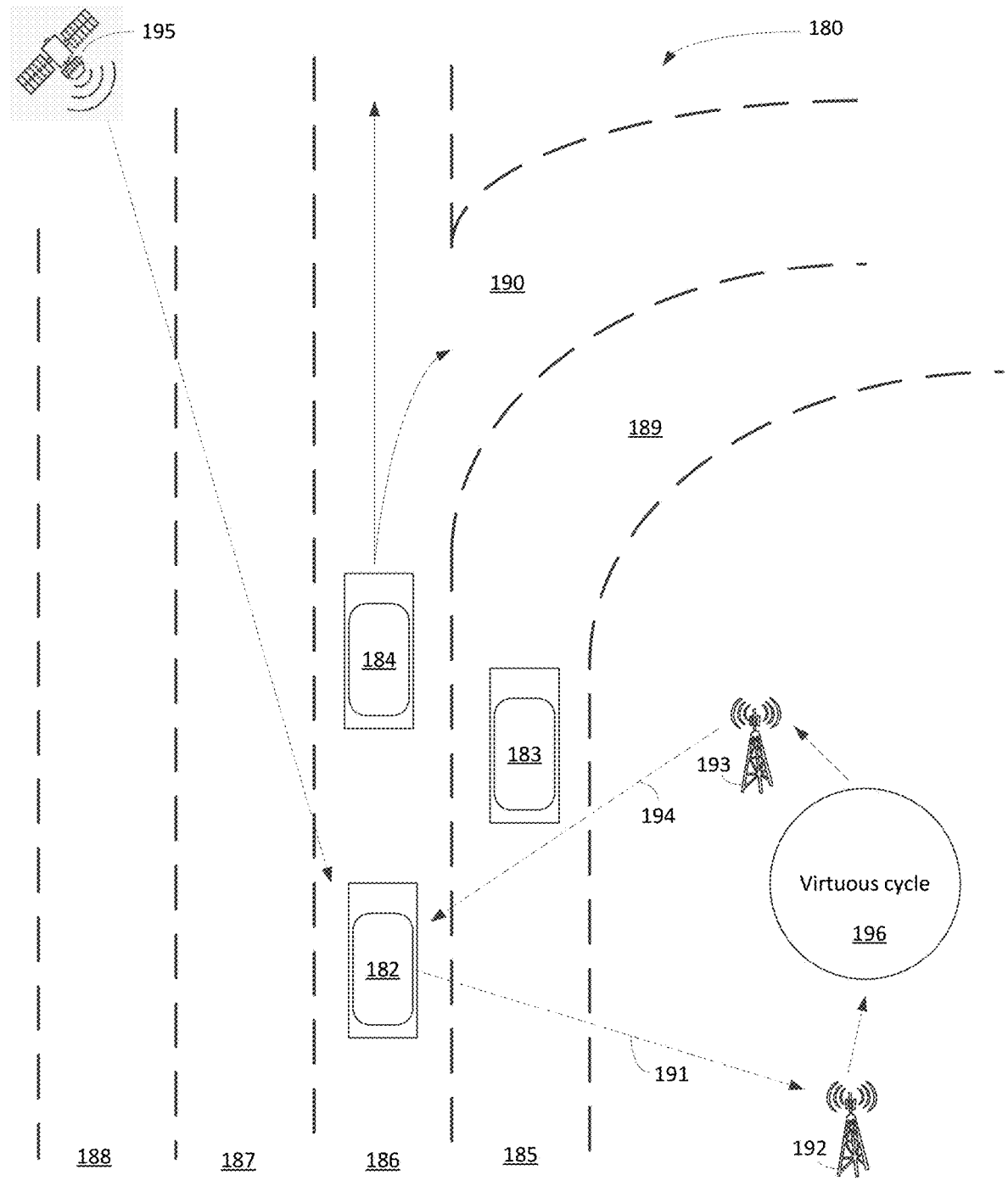
FIGS. 1C-1E are diagrams illustrating GR model providing GPS refinement using inward and/or outward facing cameras via a virtuous cycle in accordance with one embodiment of the present invention.

FIG. 1C is a block diagram 180 illustrating a process of GR model capable of providing GPS refinement using the outward facing cameras via a virtuous cycle in accordance with one embodiment of the present invention. Diagram 180 includes four lanes 185-188, vehicle 182, two cars 184-184, GPS 195, and virtuous cycle 196. Lane 185, in one example, is lane 1, and land 188 is lane 4 wherein lanes 1-2 have exit ramps 189-190. It should be noted that the underlying concept of the exemplary embodiment(s) of the present invention would not change if one or more blocks (components or elements) were added to or removed from diagram 180.

In one embodiment, vehicle 182 constantly receiving GPS information from GPS 195 wants to take the upcoming exit ramp. The GPS information from GPS 195 typically does not provide information as to whether vehicle 182 should stay on lane 186 or move to lane 185 because GPS 195 does not know exactly which lane that vehicle is currently on. The GR system in vehicle 182, however, obtains external images via outward facing cameras and subsequently uploads external images to virtuous cycle 196 via wireless connections 191-192. Upon calculation, virtuous cycle 196 pushes positional vehicle location back to vehicle 182 via wireless connections 193-194. After combining GPS information with positional vehicle location, the GR model displays a refined GPS navigation guidance such as lane 186 which is you are on it can lead to the upcoming exit 190.

It should be noted that conventional navigation systems provide turn by turn and specific lane instructions. However, the resolution of GPS is not high enough to determine which lane the car is in. By employing the GR model, the navigation system can alert the driver to change lanes when appropriate. In one example, using raw GPS location points, actual car position, detected reference object such as an overhead exit sign and lane markings, a more user friendly traffic guidance system can be derived based on combining the GPS data and positional vehicle location data.

In one embodiment, the GR system uses visual landmarks extracted in real-time from a video camera in order to provide more real-time and accurate positioning information. For example, a forward facing camera on a vehicle can detect the lane markings on a road, and thus "know" whether the vehicle is in the rightmost lane as opposed to one lane over. Typical GPS resolution can't resolve to that degree. Additionally, a database of surveyed road signage can be used as reference objects used to calculate current distance, and multiple such objects can be used to triangulate and calculate very precise location information.

The GR model uses outward facing cameras to extract high-level metadata from input streams consisting of video, audio, and other sensors, as well as a software component integrating that information, detailed positional information can be inferred. For example, a forward facing camera could detect the various lane markings (white and yellow lines, either solid or dashed) and thus "know" which lane the car is currently driving in. This information represents finer grain positional information that is available via a GPS signal. The detailed positional information can be used to do a better job of informing the driver when giving turn-by-turn directions. For instance, if the navigation system is instructing the driver to take a particular exit from the highway, the limited resolution of GPS does not allow the system to detect whether the car is currently in the correct lane to affect an exit. With the additional positional information from the described system, a navigation system could announce "move one lane to the right and exit in ¼ mile".

The GR model, in one embodiment, also uses triangulation from single or multiple camera sources. For example, the focal length of the camera source is a known quantity, one or more cameras can calculate the exact position of the vehicle using a database of known landmark and their absolute dimensions. For example, if the size of the exit sign on the highway is known via external survey and that size has been captured in a database, it can be used to calculate how far the camera lens is from the sign. By combining multiple landmarks visible to a single camera, or multiple or single landmarks visible to multiple cameras, the process of triangulation can be used to narrow the range of possible locations to a point in space, or an arc. In the case of an arc, the intersection of the known survey location of the current road and that arc will allow the calculation of very specific location information.

Figure 1D:
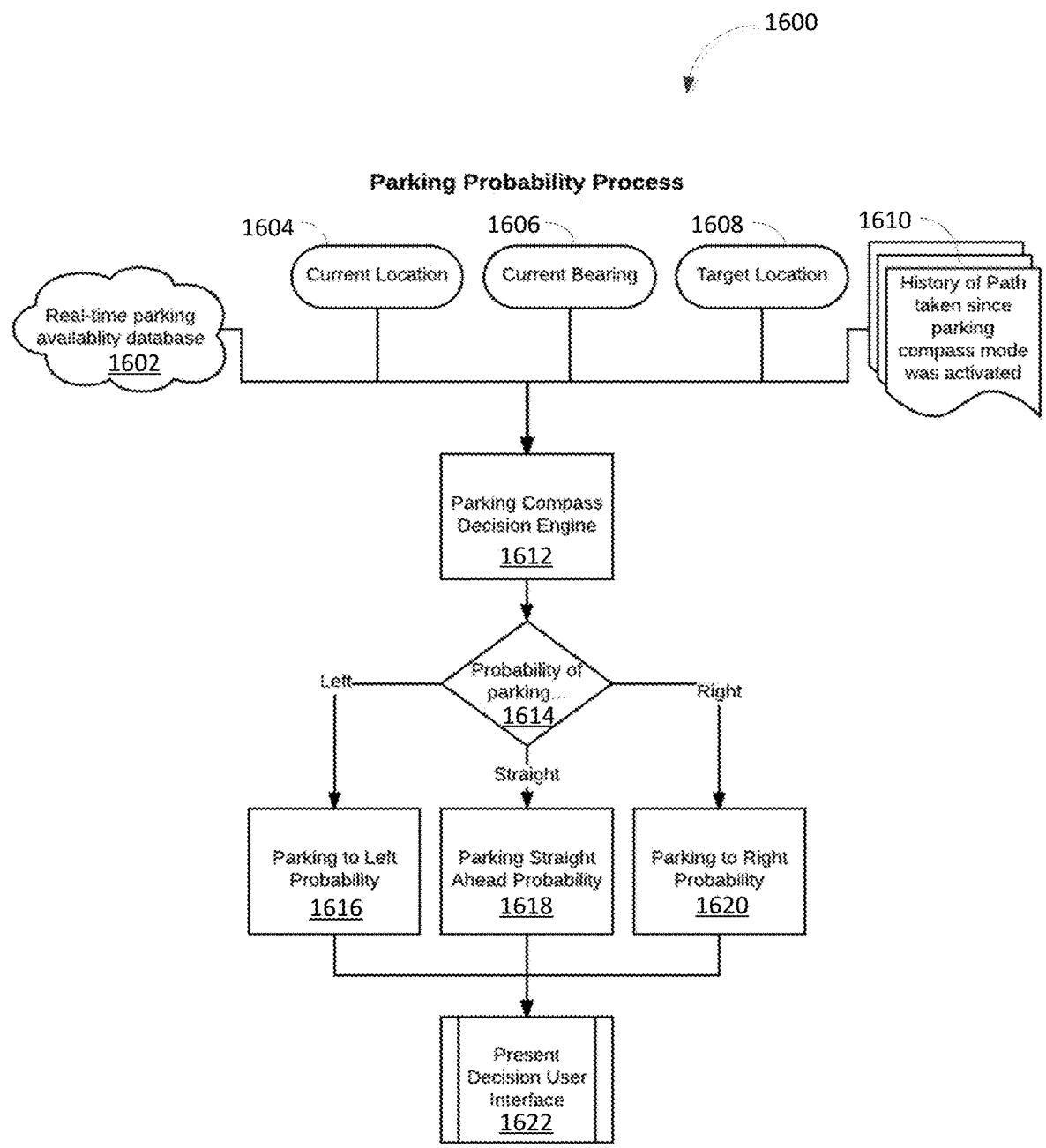

FIG. 1D is a logic block diagram illustrating GR model providing GPS refinement capable of providing parking probability process via a virtuous cycle in accordance with one embodiment of the present invention. A parking compass 1612 receives inputs from real-time parking availability database 1602, current location 1604, current bearing 1606, target location 1608, and history of path taken 1610. History of path taken 1610 indicates parking compass mode is activated. Upon processing inputs, decision engine of parking compass generates a result which subsequently is sent to block 1614 to evaluate the probability of parking based on the direction of vehicle moves. For example, by turning left, block 1616 provides left parking probability and block 1620 provides right parking probability if the vehicle turns right. Block 1618 provides straight ahead parking probability if the vehicle moves in straight direction. Block 1622 presents a decision via a user interface such as an interactive parking compass which can be a part of GPS navigation system.

Figure 1E:
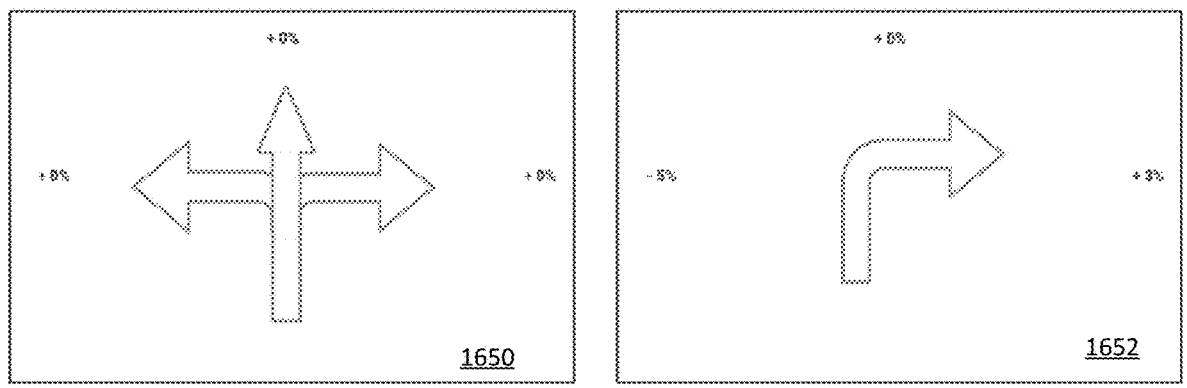
Figure 1E:

FIG. 1E illustrates two exemplary parking compass displays 1650-1652 facilitated by GR model in accordance with one embodiment of the present invention. Diagram 1650 illustrates a scenario showing left parking possibilities, right parking possibilities, and straight ahead parking possibilities. Diagram 1652 illustrates a scenario of turn right is the best parking option at this moment.

The GR model, in one embodiment, provides directions for the "last leg" of a navigation session. Usually, conventional navigation systems take as input a desired location (such as address or GPS coordinates) and provide the user with turn-by-turn assistance in arriving at that location. The system being described allows an enhanced modality for the final portion of the trip. Often times, when an operator want directions to a location, upon getting near they would prefer directions to the most convenient or available parking. The system being described can use a stored statistical model of where nearby parking is typically available, or access a real-time cloud based database to direct the user. In some cases, the GR system can direct the user to parking in advance of arriving at the exact specific address.

In one embodiment, a GR model uses external cameras to extract real-time metadata which can be high-level metadata from input streams including video, audio, and other sensors, as well as a software component integrating that information. The GR system is capable of changing modalities when approaching the location that the user has chosen. When the vehicle is within a certain distance, the system can stop giving turn-by-turn directions that lead to the final destination. Instead, the system can use two data sets to decide how to proceed: 1) using the real-time extracted metadata, the system could "spot" upcoming empty parking spaces and direct the driver to that location, and 2) using a statistically generated "map" of where and when there are typically open parking spots, the system can construct a series of turn-by-turn directions that are designed to maximize the probability of finding an open parking space. For example, the final destination might be on 123 Main Street, but historically it is very difficult to find parking on that street at the current time and day. The system instead could know that a cross street just one block away typically has ample free parking spots available. It would use that information to select a "search path" near the final destination that included streets likely to have parking available.

It should be noted that raw GPS has wide variance and error, particularly in urban areas. Refinement using external facing cameras and object detection can enhance the accuracy and resolution. Additionally, GPS location, extracted metadata from external facing cameras, and cloud-based data can be used to provide navigational assistance that is contextually appropriate.

An advantage of GR system is to refine or compensate current navigation systems that give directions to specified addresses. However, it is frequently the case that the goal is not to get the car to the exact address. The goal is to park the car as near the address as possible and then have the driver walk to the specified address. This "last 100 yards" problem is solved by the application of GR system. When the vehicle is "close enough" to the address in question, the navigation system switched into a "parking place seeking" mode. By contacting a cloud-based parking availability service, the system can know in which direction there is the highest probability of finding an open parking space.

One modality of the system is referred to as a "parking compass" and its manifestation is that at each intersection, the navigation system simply informs the driver which option (left, straight ahead, right) has the highest probability of finding parking. Note that there is "memory" in the algorithm so that a set of choices yields a pathway that stays close to the target address and minimizes duplication of going down the same blocks. One exception to this is when some of the blocks have a known high-churn rate (new spaces open up frequently) in which case it is acceptable to visit that block more than once when searching for a parking space.

It should be noted that the real-time detection (from external facing cameras) of available parking spaces on a given block has two applications. By detecting a space, the user-experience can alert the driver of the location of the empty space or allowing the driver to spend more time with their eyes on the road. Secondly, the data collected on parking space availability is uploaded to a cloud-service which aggregates that data, creating a real-time parking map that informs the "parking compass" system of other cars. This same data is used to create a historical model of open parking spaces, which is used to compute the probability of finding parking in the various directions available to the driver. Note that all of this data is analyzed in time tranches, since parking availability varies dramatically based on time of day.

An advantage of using GR model is that the refined GPS navigation guidance provides proactive parking and/or lane change real-time assistance.

In an alternative embodiment, the presently claimed invention discloses a crowd source data ("CD") model configured to manage crowd source data using a virtuous cycle containing sensors, MLC and CBN. In one aspect, after receiving an incentive message from a CD model requesting vehicle to pass through a location for collecting real-time video associated with the location, the process is capable of activating at least a portion of outward facing cameras mounted to the vehicle for capturing external real-time images representing a surrounding environment in which the vehicle passes through the location. Upon uploading the external real-time images to cloud based processors to process and categorize captured real-time video and image information for a geographic area including the location, a report describing monitoring record of the location is forwarded to a subscriber. Alternatively, the process is able to create a bid process for receiving incentives for driving through the location. Also, the CD model can reroute trips to cover the location in a regular basis.

The CD system, in one aspect, where a collection of static cameras, in addition to a fleet of vehicles, acts as a group to collect real-time video and image information for a given geographic area. Note that this need not be the primary purpose for example a large group of ridesharing vehicles might be collecting street-view data and uploading it in real-time to the cloud while going about the business of taking customers from place to place. In order to maintain an appropriate level of real-time updates at every point of interest, the system creates allows for the creating of "bids" or incentives for participants to supply needed imagery. For example, if the imagery for the intersection of $4^{th}$ Avenue and Main Street is 15 minutes old, and the system is trying to maintain data that is no more than 12 minutes old, an incentive can be provided to the set of drivers (idle or otherwise) in order for them to pass by the needed location. Alternatively, a simple rerouting of an already planned trip would not delay the driver, yet would net them additional revenue by supplying the needed real-time imagery. It should be noted that static, outward facing cameras at business or private homes could also participate in this network.

An advantage of using CD system is that the system facilitates various moving vehicles to constantly capture and/or collect real-time images, sound, odor, temperature, and the like for various purposes, such as security, evidence, warning, et cetera.

In an alternative embodiment, a continuously trained model facilitated by the virtuous cycle which includes sensors, MLC, CBN, and various specialized processing containers is able to perform unique tasks based on the applications. In one aspect, a continuously trained model can be configured to provide a function of adaptive detection of an impaired driver using inward facing sensors and outward facing sensors managed by the virtuous cycle.

A system capable of providing a function of adaptive detection of an impaired driver or operator uses one or more cameras, one or more microphones, and/or other sensory inputs to extract real-time metadata regarding the current behavior of a driver, as well as extracting metadata regarding the external situation surrounding the vehicle. The system builds a model that captures the "typical pattern" for a particular driver in various modalities or driving situations. For example, the system can build a model of how the driver uses the brake, accelerator, how closely the vehicle follows traffic, how fast the vehicle typically travels, how often the driver blinks, how often the driver uses the blinker, et cetera. When a driver is impaired, whether it is due to alcohol, controlled substances, sleep deprivation, medications, the pattern should be different from the normal driving behavior. The system can detect this difference and uses such information accordingly. For example, the system can query the driver, when the vehicle is stopped, whether they feel well enough to continue driving.

In one embodiment, the system uses external cameras to extract real-time metadata, such as high-level metadata from input streams containing video, audio, and other sensors, as well as software component integrating that information. The system is capable of recognizing particular driver and collecting the data patterns associated with that driver. These data patterns can be stored locally or forwarded to the cloud, where they can be used directly, or used to train a neural network based machine learning model. That model can then be "pushed" to the vehicle, and used by vehicle local compute elements. The system would use the current state of the vehicle to identify "modalities" of use that may have specific patterns that affect driver behavior. For example, at night time, a driver might consistently drive slower than they do during the day, or they might follow less closely than they would in the day time. When a comparison is made in order to detect a pattern of driving choices that indicated impaired performance for the driver in question, these modalities are taken into account. The result is a system that can detect impaired driving far better than any "generic" attempt at detecting an impaired driver without any knowledge of how they normally drive.

In addition to described metrics to detect the impairment, the relative timing of outward facing events and driver action ("reaction time") can be measured and correlated. Since the system can detect such external events as "brake lights on the car ahead came on" and "light turned yellow", and then notice reactive behavior on the part of the driver such as pressing on the brake, the system can be designed to use its measurement of reaction time to model driver behavior, and use that model to determine if a driver is impaired.

The system can also sense driver impairment via detection of anomalous behavior before driving. For example, the metric of driver patterns can in fact be categorized even before driving has started. The baseline timing of the driver getting into the car, starting the engine, interacting with seat belt, et cetera, recorded on a per user basis, such baseline timing can enable the system to detect a potentially impaired driver prior to the car being driven.

In an alternative aspect, a continuously trained model can be configured to provide a function of retail traffic analysis using inward facing sensors and outward facing sensors managed by the virtuous cycle. In one example, the system capable of providing retail traffic analysis uses moving cameras as well as stationary cameras to identify vehicle location based on the GPS locating application and the real-time extracted metadata. Based on the presence of vehicle location, historical data for driver preferences, historical data for passenger preferences, and retainer in the location, the model is capable of facilitating commercial communication, such as advertisement, traffic statistics, and availabilities, between driver(s) and retainers. Commercial activities that can be facilitated by the model include analyzing promotions, targeted advertisement, and driving guidance. It should be noted that couponing and promotional strategies can be analyzed as well as competitive benchmarking.

Figure 1F:
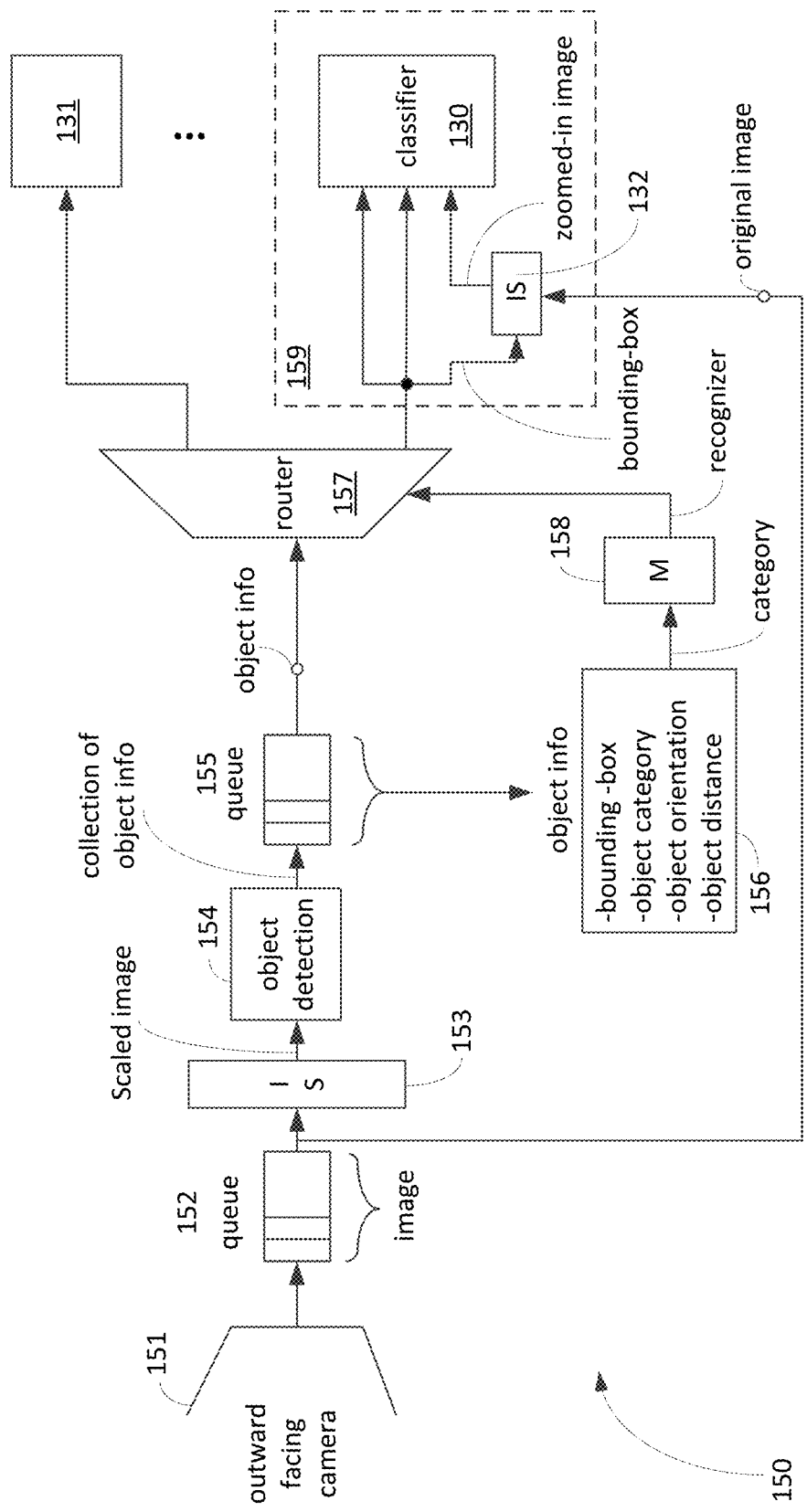
FIGS. 1F-1H is a block diagram illustrating a pipeline process of outward facing camera capable of identifying and classifying detected object(s) using a virtuous cycle in accordance with one embodiment of the present invention.

FIG. 1F is a logic block diagram illustrating a pipeline process 150 of outward facing camera capable of identifying and classifying detected object(s) using a virtuous cycle in accordance with one embodiment of the present invention. Outward facing camera 151 collects images and the images are stored in a queue 152. After scaling the images by image scaling component 153, the scaled image is forwarded to object detection 154. Object detection 154 generates a collection of objection information which is forwarded to queue 155. The object information which includes bounding-box, object category, object orientation, and object distance is forwarded to component 156 and router 157. Upon categorizing the object information at block 156, the categorized data is forwarded to map 158. After recognizing the object based on map 158, the recognizer is forwarded to router 157. After routing information at router 157, the output images are forwarded to block 159 which uses classifier 130-131 to classify the images and/or objects.

Pipeline process 150 illustrates a logic processing flow which is instantiated for the purpose of processing incoming data, extracting metadata on a frame by frame or data packet basis, and forwarding both frames and metadata packets forward through the pipeline. Each stage of the pipeline can contain software elements that perform operations upon the current audio or video or sensor data frame. The elements in the pipeline can be inserted or removed while the pipeline is running, which allows for an adaptive pipeline that can perform different operations depending on the applications. The pipeline process is configured to adapt various system constraints that can be situationally present. Additionally, elements in the pipeline can have their internal settings updated in real-time, providing the ability to "turn off," "turn on" elements, or to adjust their configuration settings on the fly.

Pipeline process 150 includes a metadata packet schema which includes name/value pairs with arbitrary nesting and basic primitive data types such as arrays and structures that is used to create a self-describing and both machine and human readable form of the extracted real-time metadata flowing through the system. Such a generalized schema allows multiple software components to agree on how to describe the high level events that are being captured and analyzed and acted upon by the system. For example, a schema is constructed to describe the individual locations within a video frame of a person's eyes, nose, mouth, chin line, etc. Such a data structure allows a downstream software component to infer even higher level events, such as "this person is looking up at 34 degrees above the horizon" or "this person is looking left 18 degrees left of center." The process can subsequently construct additional metadata packets and insert them into the stream, resulting in higher level semantic metadata that the system is able to act upon.

Figure 1G:
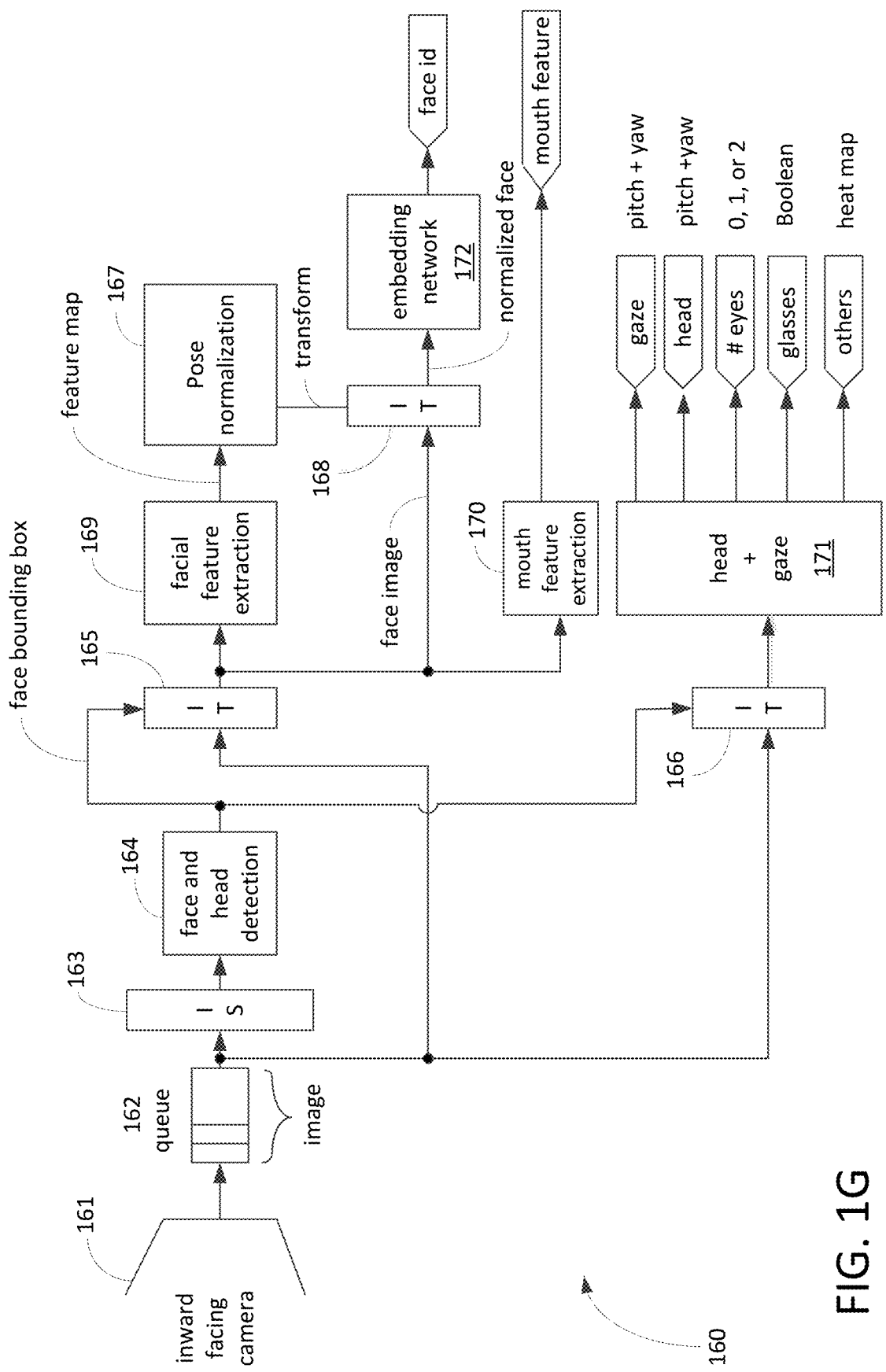

FIG. 1G is a logic block diagram illustrating a pipeline process 160 capable of identifying and classifying face detection, head and gaze orientation, and mouth features using a virtuous cycle in accordance with one embodiment of the present invention. Inward facing camera 161 collects images and the images are stored in a queue 162. After scaling the images by image scaling component 163, the scaled image is forwarded to face and head detection 164. The output of detection 164 is forwarded to image transform ("IT") components 165-166. After transformation, the transformed image is forwarded to blocks 169-170. After facial feature extraction in block 169, the feature map is forwarded to block 167 for pose normalization. Block 168 receives face images from IT component 165 and transformed images from block 167; the normalized face image is forwarded to block 172. Upon processing normalized face with embedding network at block 172, a face ID is identified.

Block 170 extracts mouth feature and generates mouth feature(s) of driver. Block 171 processes head and gaze based on output of IT component 166 which receives information with both scaled and unscaled images. In one example, block 171 is capable of generating various features, such as gaze, head, number of eyes, glasses, and the like.

Figure 1H:
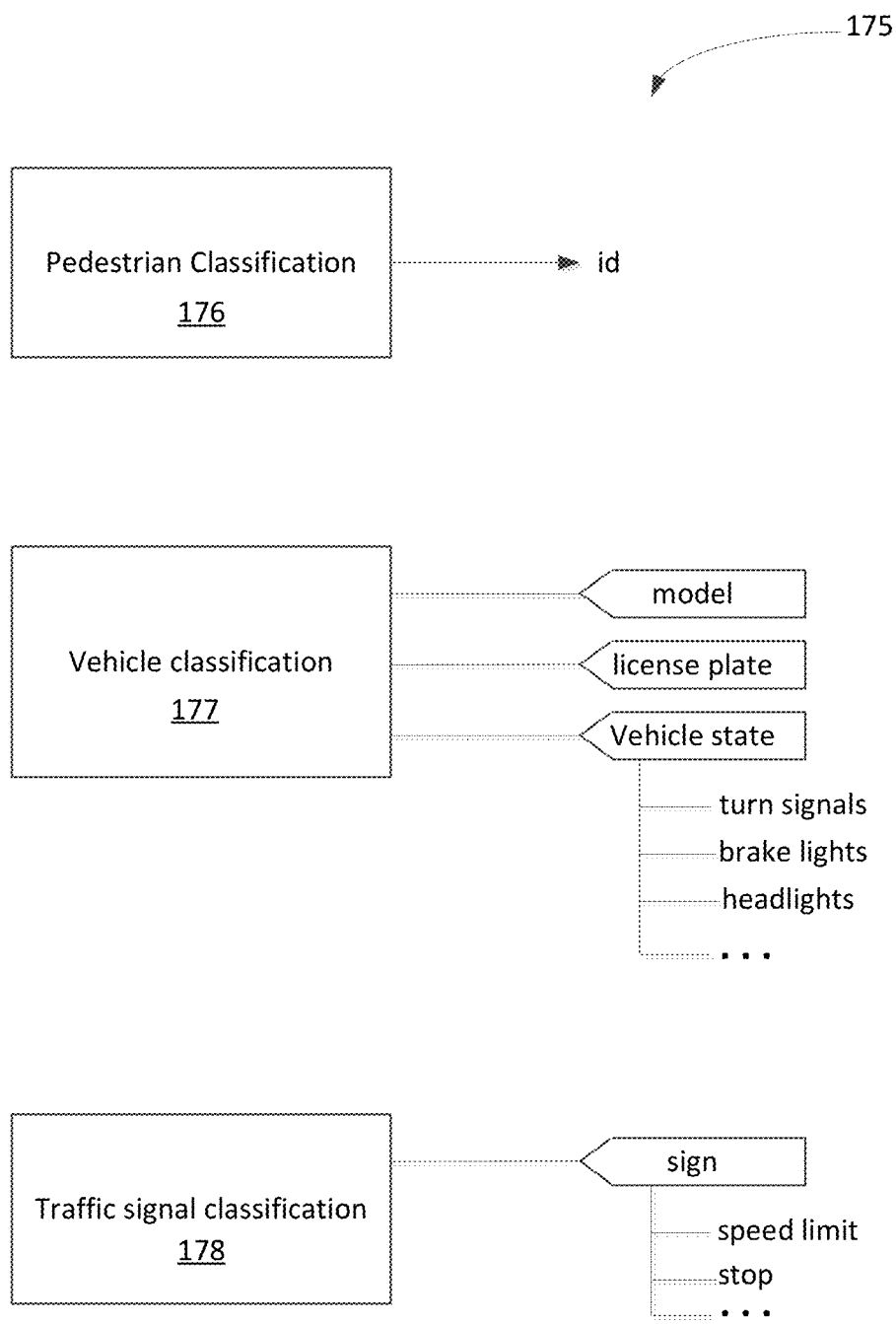

FIG. 1H is a logic block diagram 175 illustrating a process of classifying detected object(s) using a virtuous cycle in accordance with one embodiment of the present invention. Block 176 is a software element used to classify a pedestrian based on collected external images captured by outward facing cameras. Based on collected data and historical data, pedestrian may be identified. Block 177 is a software element used to classify a vehicle based on collected external images captured by outward facing cameras. Based on collected data and historical data, vehicle information can be identified. The exemplary classification information includes model of the vehicle, license plate, state of vehicle registration, and the like. In addition, formation such as turn-signals, brake lights, and headlights can also be classified via facilitation of virtuous cycle. Block 178 is a software element used to classify traffic signals or conditions according to collected external images captured by outward facing cameras. For example, according to collected data as well as historical data, the traffic signal can be classified. The exemplary classification includes sign, speed limit, stop sign, and the like.

Figure 2A:
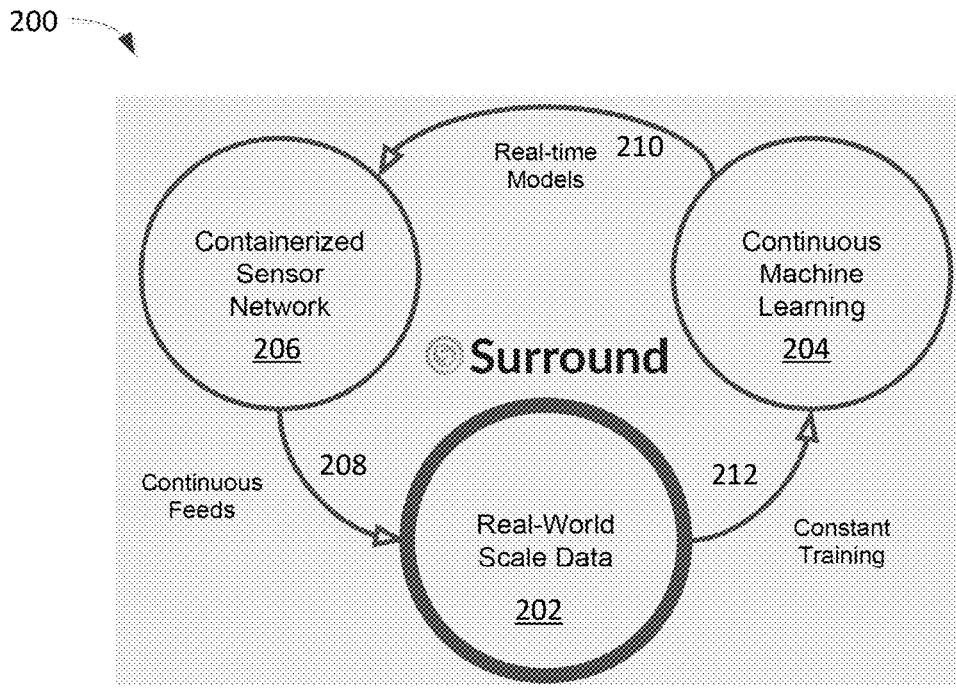
FIGS. 2A-2B are block diagrams illustrating a virtuous cycle capable of facilitating GR model detection in accordance with one embodiment of the present invention.

FIG. 2A is a block diagram 200 illustrating a virtuous cycle capable of detecting or monitoring GR system in accordance with one embodiment of the present invention. Diagram 200, which is similar to diagram 100 shown in FIG. 1A, includes a containerized sensor network 206, real-world scale data 202, and continuous machine learning 204. In one embodiment, continuous machine learning 204 pushes real-time models to containerized sensor network 206 as indicated by numeral 210. Containerized sensor network 206 continuously feeds captured data or images to real-world scale data 202 with uploading in real-time or in a batched format. Real-world scale data 202 provides labeled data to continuous machine learning 204 for constant model training as indicated by numeral 212. It should be noted that the underlying concept of the exemplary embodiment(s) of the present invention would not change if one or more blocks (or elements) were added to or removed from FIG. 2A.

The virtuous cycle illustrated in diagram 200, in one embodiment, is configured to implement GR system wherein containerized sensor network 206 is similar to vehicle 102 as shown in FIG. 1A and real-world scale data 202 is similar to CBN 104 shown in FIG. 1A. Also, continuous machine learning 204 is similar to MCL 106 shown in FIG. 1A. In one aspect, containerized sensor network 206 such as an automobile or car contains a containerized sensing device capable of collecting surrounding information or images using onboard sensors or sensor network when the car is in motion. Based on the GR model, selective recording the collected surrounding information is selectively recorded to a local storage or memory.

Real-world scale data 202, such as cloud or CBN, which is wirelessly coupled to the containerized sensing device, is able to correlate with cloud data and recently obtained GR data for producing labeled data. For example, real-world scale data 202 generates GR labeled data based on historical GR cloud data and the surrounding information sent from the containerized sensing device.

Continuous machine learning 204, such as MLC or cloud, is configured to train and improve GR model based on the labeled data from real-world scale data 202. With continuous gathering data and training GR model(s), the GR system will be able to learn, obtain, and/or collect all available data for the population samples.

In one embodiment, a virtuous cycle includes partitionable Machine Learning networks, training partitioned networks, partitioning a network using sub-modules, and composing partitioned networks. For example, a virtuous cycle involves data gathering from a device, creating intelligent behaviors from the data, and deploying the intelligence. In one example, partition idea includes knowing the age of a driver which could place or partition "dangerous driving" into multiple models and selectively deployed by an "age detector." An advantage of using such partitioned models is that models should be able to perform a better job of recognition with the same resources because the domain of discourse is now smaller. Note that, even if some behaviors overlap by age, the partitioned models can have common recognition components.

It should be noted that more context information collected, a better job of recognition can be generated. For example, "dangerous driving" can be further partitioned by weather condition, time of day, traffic conditions, et cetera. In the "dangerous driving" scenario, categories of dangerous driving can be partitioned into "inattention", "aggressive driving", "following too closely", "swerving", "driving too slowly", "frequent breaking", deceleration, ABS event, et cetera.

For example, by resisting a steering behavior that is erratic, the car gives the driver direct feedback on their behavior—if the resistance is modest enough then if the steering behavior is intentional (such as trying to avoid running over a small animal) then the driver is still able to perform their irregular action. However, if the driver is texting or inebriated then the correction may alert them to their behavior and get their attention. Similarly, someone engaged in "road rage" who is driving too close to another car may feel resistance on the gas pedal.

In one aspect, a model such as GR model includes some individual blocks that are trained in isolation to the larger problem (e.g. weather detection, traffic detection, road type, etc.). Combining the blocks can produce a larger model. Note that the sample data may include behaviors that are clearly bad (ABS event, rapid deceleration, midline crossing, being too close to the car in front, etc.). In one embodiment, one or more sub-modules are built. The models include weather condition detection and traffic detection for additional modules intelligence, such as "correction vectors" for "dangerous driving."

An advantage of using a virtuous cycle is that it can learn and detect object such as GR in the real world.

Figure 2B:
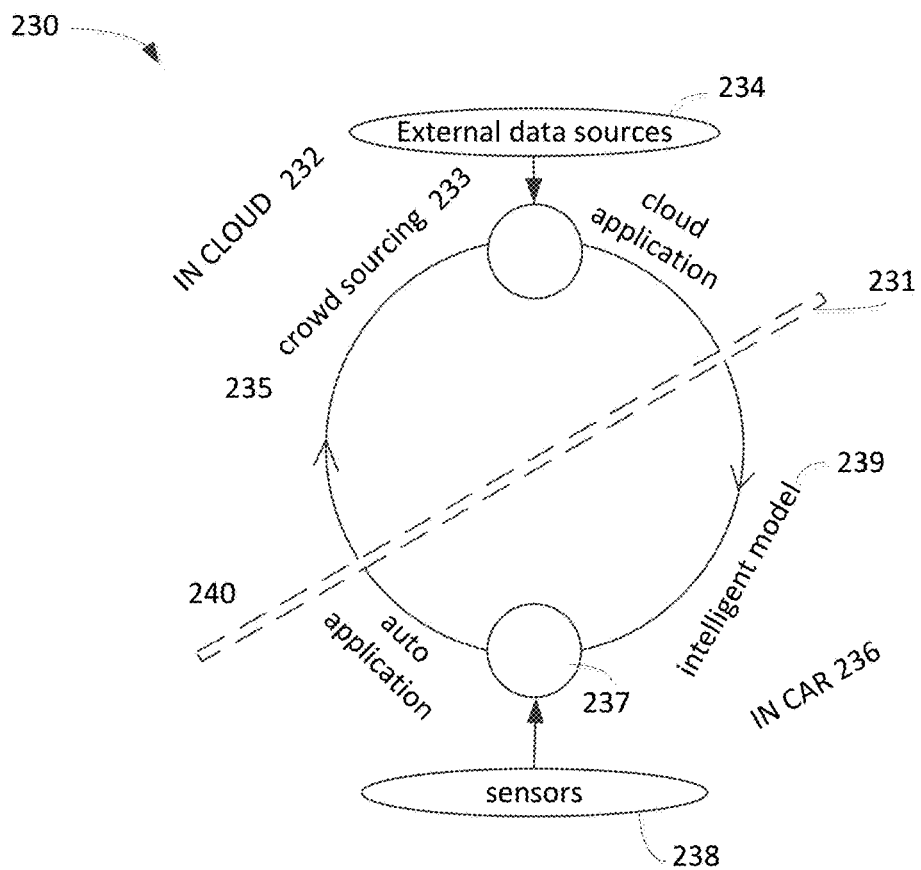

FIG. 2B is a block diagram 230 illustrating an alternative exemplary virtuous cycle capable of detecting GR in accordance with one embodiment of the present invention. Diagram 230 includes external data source 234, sensors 238, crowdsourcing 233, and intelligent model 239. In one aspect, components/activities above dotted line 231 are operated in cloud 232, also known as in-cloud component. Components/activities below dotted line 231 are operated in car 236, also known as in-device or in-car component. It should be noted that the underlying concept of the exemplary embodiment(s) of the present invention would not change if one or more blocks (or elements) were added to or removed from FIG. 2B.

In one aspect, in-cloud components and in-device components coordinate to perform desirable user specific tasks. While in-cloud component leverages massive scale to process incoming device information, cloud applications leverage crowd sourced data to produce applications. External data sources can be used to contextualize the applications to facilitate intellectual crowdsourcing. For example, in-car (or in-phone or in-device) portion of the virtuous cycle pushes intelligent data gathering to the edge application. In one example, edge applications can perform intelligent data gathering as well as intelligent in-car processing. It should be noted that the amount of data gathering may rely on sensor data as well as intelligent models which can be loaded to the edge.

Figure 3:
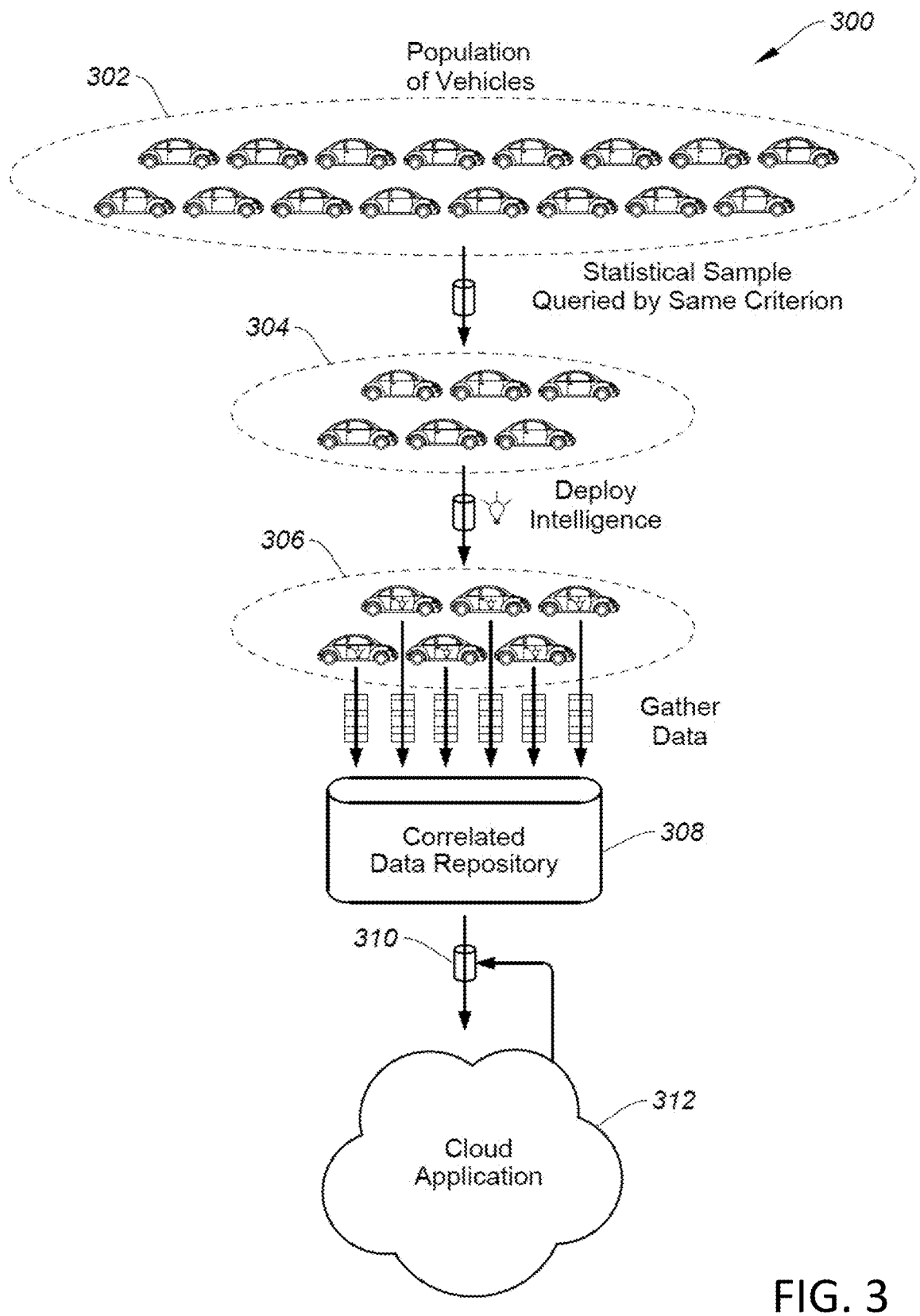
FIG. 3 is a block diagram illustrating a cloud based network using crowdsourcing approach to improve GR model in accordance with one embodiment of the present invention.

FIG. 3 is a block diagram 300 illustrating a cloud based network using crowdsourcing approach to improve GR model(s) in accordance with one embodiment of the present invention. Diagram 300 includes population of vehicles 302, sample population 304, models deployment 306, correlation component 308, and cloud application 312. It should be noted that the underlying concept of the exemplary embodiment(s) of the present invention would not change if one or more blocks (or samples) were added to or removed from FIG. 3.

Crowdsourcing is a process of using various sourcing or specific models generated or contributed from other cloud or Internet users for achieving needed services. For example, crowdsourcing relies on the availability of a large population of vehicles, phones, or other devices to source data 302. For example, a subset of available devices such as sample 304 is chosen by some criterion such as location to perform data gathering tasks. To gather data more efficiently, intelligent models are deployed to a limited number of vehicles 306 for reducing the need of large uploading and processing a great deal of data in the cloud. It should be noted that the chosen devices such as cars 306 monitor the environment with the intelligent model and create succinct data about what has been observed. The data generated by the intelligent models is uploaded to the correlated data store as indicated by numeral 308. It should be noted that the uploading can be performed in real-time for certain information or at a later time for other types of information depending on the need as well as condition of network traffic.

Correlated component 308 includes correlated data storage capable of providing a mechanism for storing and querying uploaded data. Cloud applications 312, in one embodiment, leverage the correlated data to produce new intelligent models, create crowd sourced applications, and other types of analysis.

Figure 4:
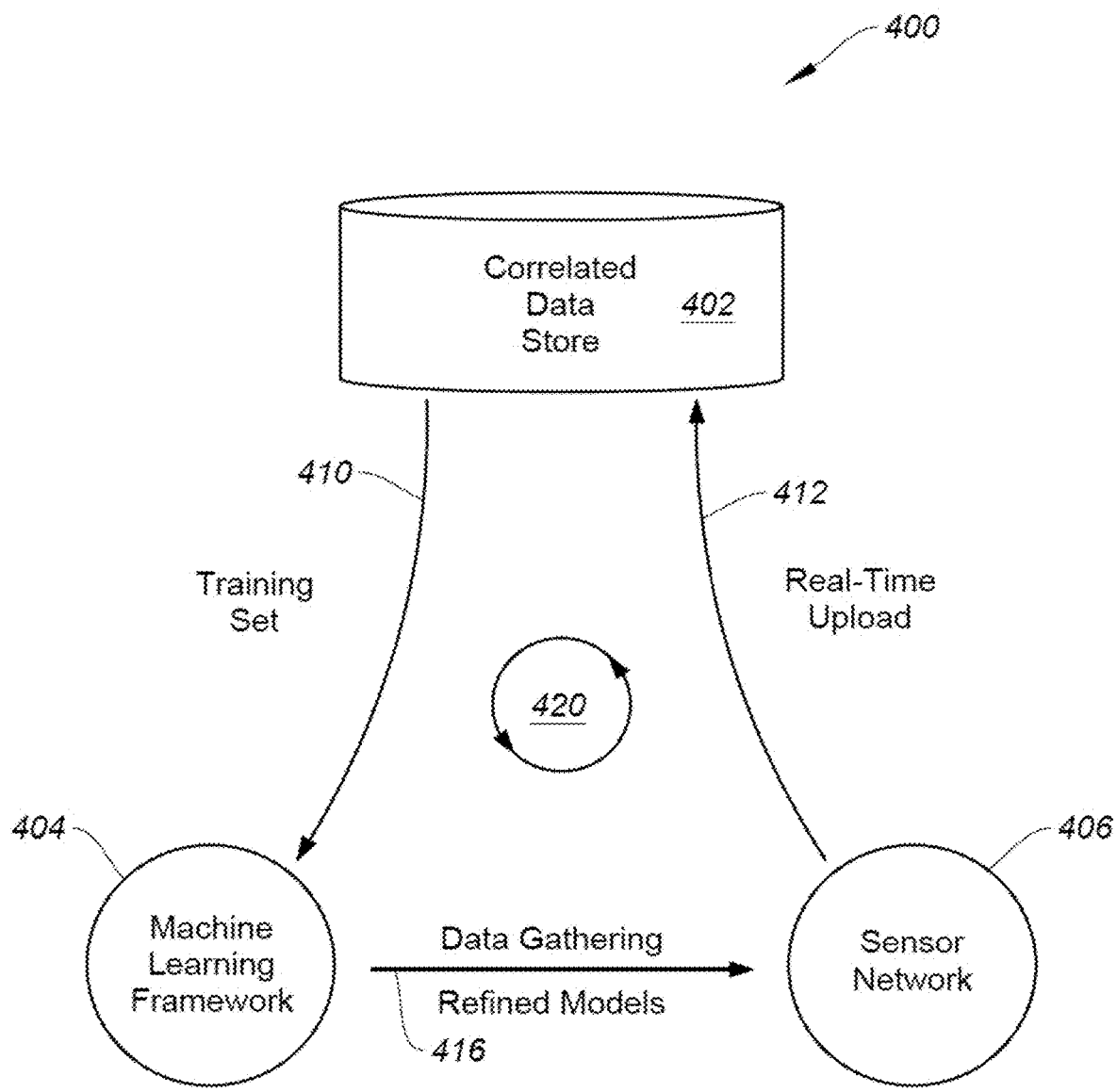
FIG. 4 is a block diagram illustrating GR model or system using the virtuous cycle in accordance with one embodiment of the present invention.

FIG. 4 is a block diagram 400 illustrating a GR system using the virtuous cycle in accordance with one embodiment of the present invention. Diagram 400 includes a correlated data store 402, machine learning framework 404, and sensor network 406. Correlated data store 402, machine learning framework 404, and sensor network 406 are coupled by connections 410-416 to form a virtuous cycle as indicated by numeral 420. It should be noted that the underlying concept of the exemplary embodiment(s) of the present invention would not change if one or more blocks (circuit or elements) were added to or removed from FIG. 4.

In one embodiment, correlated data store 402 manages real-time streams of data in such a way that correlations between the data are preserved. Sensor network 406 represents the collection of vehicles, phones, stationary sensors, and other devices, and is capable of uploading real-time events into correlated data store 402 via a wireless communication network 412 in real-time or in a batched format. In one aspect, stationary sensors includes, but not limited to, municipal cameras, webcams in offices and buildings, parking lot cameras, security cameras, and traffic cams capable of collecting real-time images.

The stationary cameras such as municipal cameras and webcams in offices are usually configured to point to streets, buildings, parking lots wherein the images captured by such stationary cameras can be used for accurate labeling. To fuse between motion images captured by vehicles and still images captured by stationary cameras can track object(s) such as car(s) more accurately. Combining or fusing stationary sensors and vehicle sensors can provide both labeling data and historical stationary sampling data also known as stationary "fabric". It should be noted that during the crowdsourcing applications, fusing stationary data (e.g. stationary cameras can collect vehicle speed and position) with real-time moving images can improve ML process.

Machine Learning ("ML") framework 404 manages sensor network 406 and provides mechanisms for analysis and training of ML models. ML framework 404 draws data from correlated data store 402 via a communication network 410 for the purpose of training modes and/or labeled data analysis. ML framework 404 can deploy data gathering modules to gather specific data as well as deploy ML models based on the previously gathered data. The data upload, training, and model deployment cycle can be continuous to enable continuous improvement of models.

Figure 5:
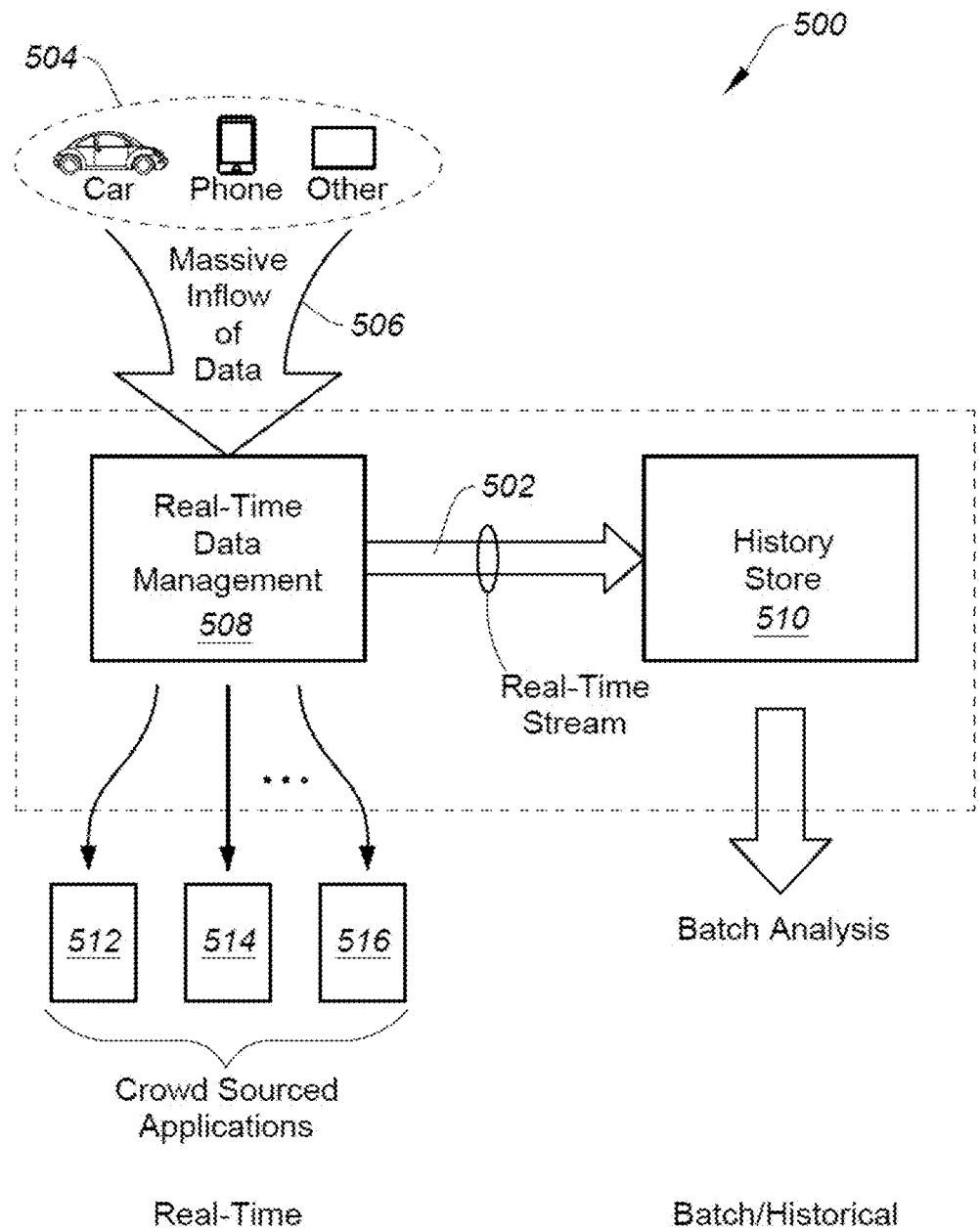
FIG. 5 is a block diagram illustrating an exemplary process of correlating GR data in accordance with one embodiment of the present invention.

FIG. 5 is a block diagram 500 illustrating an exemplary process of correlating GR data in accordance with one embodiment of the present invention. Diagram 500 includes source input 504, real-time data management 508, history store 510, and crowd sourced applications 512-516. In one example, source input 504 includes cars, phones, tablets, watches, computers, and the like capable of collecting massive amount of data or images which will be passed onto real-time data management 508 as indicated by numeral 506. It should be noted that the underlying concept of the exemplary embodiment(s) of the present invention would not change if one or more blocks (or elements) were added to or removed from FIG. 5.

In one aspect, a correlated system includes a real-time portion and a batch/historical portion. The real-time part aims to leverage new data in near or approximately real-time. Real-time component or management 508 is configured to manage a massive amount of influx data 506 coming from cars, phones, and other devices 504. In one aspect, after ingesting data in real-time, real-time data management 508 transmits processed data in bulk to the batch/historical store 510 as well as routes the data to crowd sourced applications 512-516 in real-time.

Crowd sourced applications 512-516, in one embodiment, leverage real-time events to track, analyze, and store information that can be offered to user, clients, and/or subscribers. Batch-Historical side of correlated data store 510 maintains a historical record of potentially all events consumed by the real-time framework. In one example, historical data can be gathered from the real-time stream and it can be stored in a history store 510 that provides high performance, low cost, and durable storage. In one aspect, real-time data management 508 and history store 510 coupled by a connection 502 are configured to perform GR data correlation as indicated by dotted line.

Figure 6:
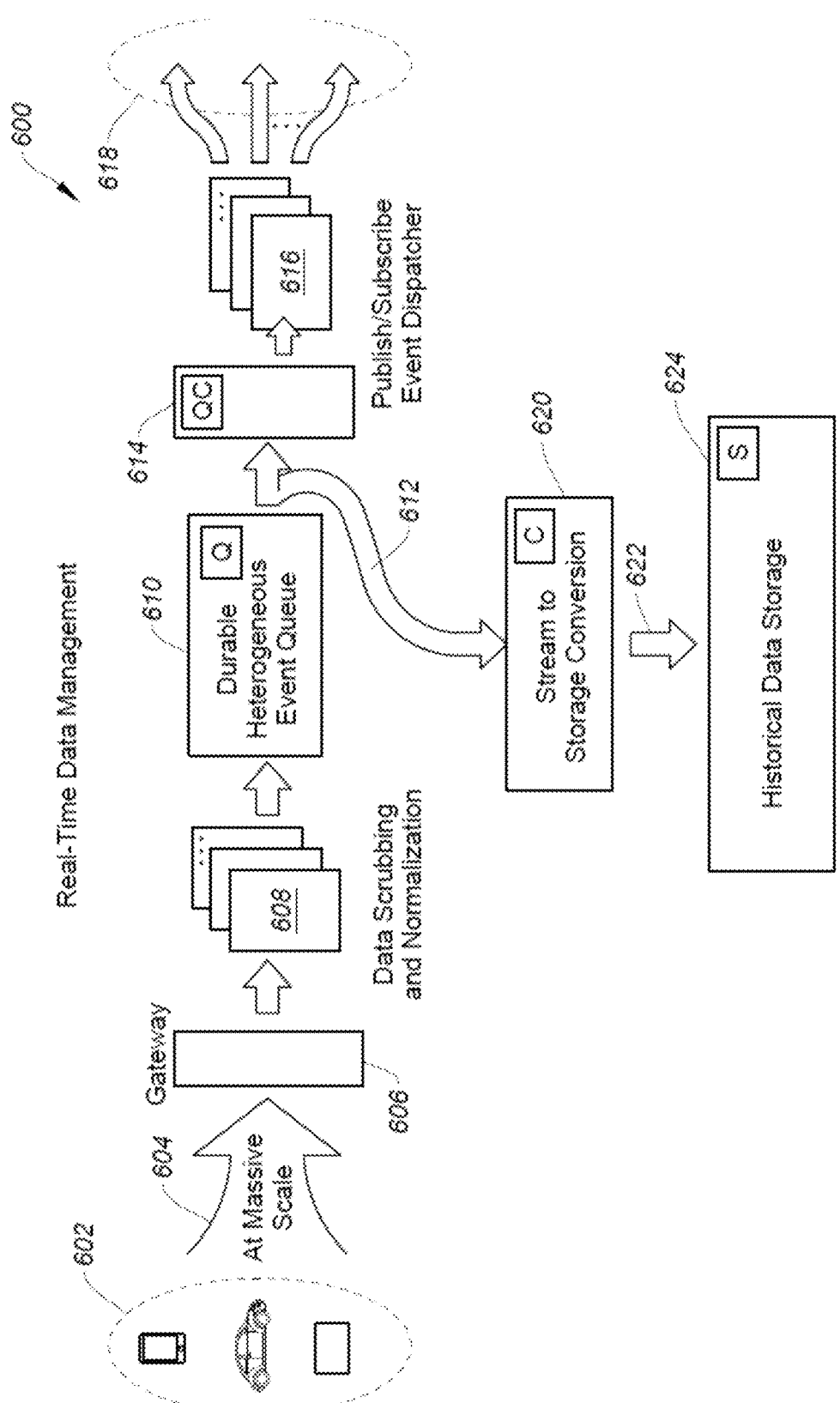
FIG. 6 is a block diagram illustrating an exemplary process of real-time data management for GR model in accordance with one embodiment of the present invention.

FIG. 6 is a block diagram 600 illustrating an exemplary process of real-time data for GR system in accordance with one embodiment of the present invention. Diagram 600 includes data input 602, gateway 606, normalizer 608, queue 610, dispatcher 616, storage conversion 620, and historical data storage 624. The process of real-time data management further includes a component 614 for publish and subscribe. It should be noted that the underlying concept of the exemplary embodiment(s) of the present invention would not change if one or more blocks (circuit or elements) were added to or removed from FIG. 6.

The real-time data management, in one embodiment, is able to handle a large numbers (i.e., 10's of millions) of report events to the cloud as indicated by numeral 604. API (application program interface) gateway 606 can handle multiple functions such as client authentication and load balancing of events pushed into the cloud. The real-time data management can leverage standard HTTP protocols. The events are routed to stateless servers for performing data scrubbing and normalization as indicated by numeral 608. The events from multiple sources 602 are aggregated together into a scalable/durable/consistent queue as indicated by numeral 610. An event dispatcher 616 provides a publish/subscribe model for crowd source applications 618 which enables each application to look at a small subset of the event types. The heterogeneous event stream, for example, is captured and converted to files for long-term storage as indicated by numeral 620. Long-term storage 624 provides a scalable and durable repository for historical data.

Figure 7:
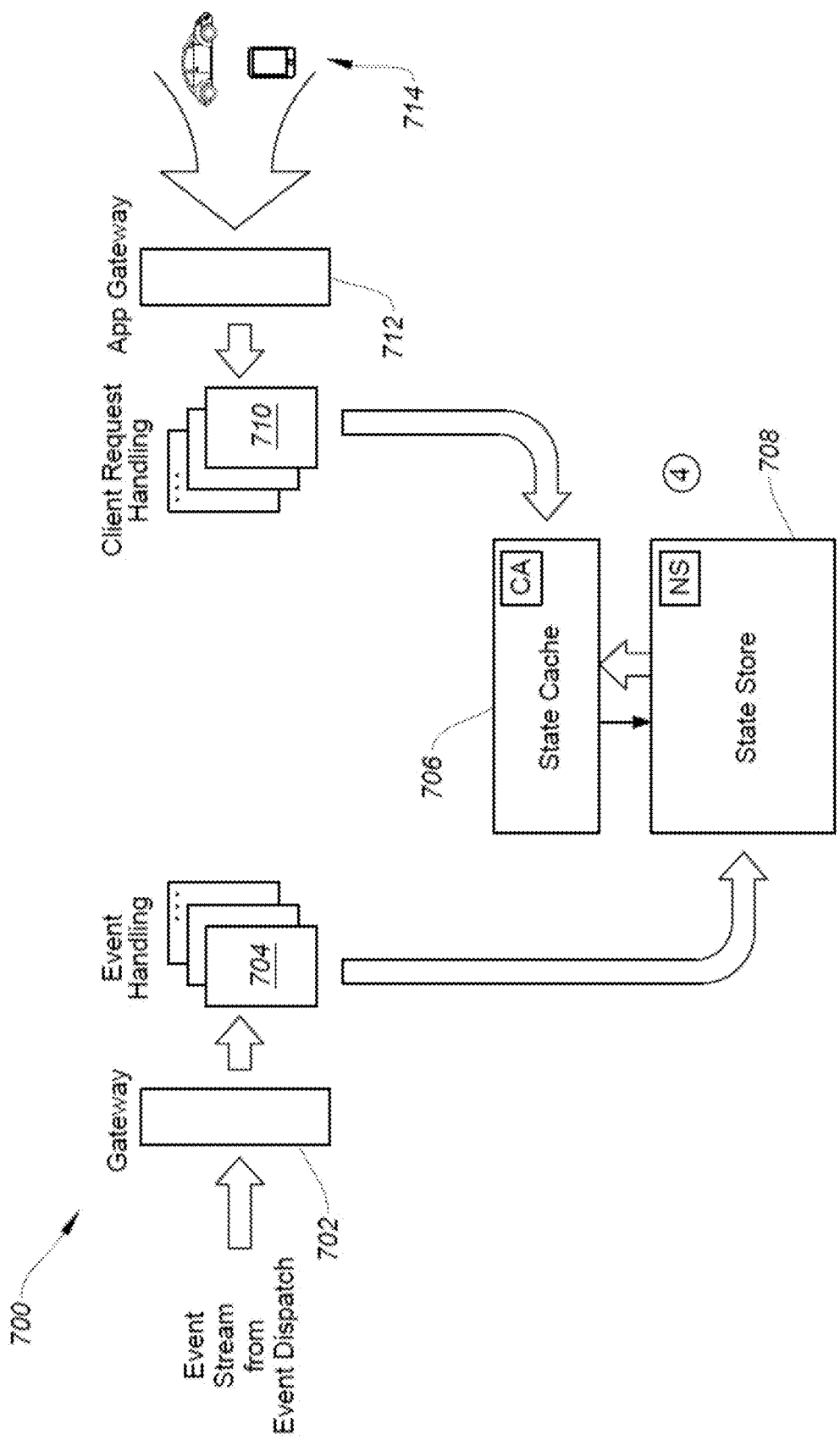
FIG. 7 is a block diagram illustrating a crowd sourced application model for GR model in accordance with one embodiment of the present invention.

FIG. 7 is a block diagram 700 illustrating a crowd sourced application model for GR model in accordance with one embodiment of the present invention. Diagram 700 includes a gateway 702, event handler 704, state cache 706, state store 708, client request handler 710, gateway 712, and source input 714. In one example, gateway 702 receives an event stream from an event dispatcher and API gateway 712 receives information/data from input source 714. It should be noted that the underlying concept of the exemplary embodiment(s) of the present invention would not change if one or more blocks (or elements) were added to or removed from FIG. 7.

The crowd sourced application model, in one embodiment, facilitates events to be routed to a crowd source application from a real-time data manager. In one example, the events enter gateway 702 using a simple push call. Note that multiple events are handled by one or more servers. The events, in one aspect, are converted into inserts or modifications to a common state store. State store 708 is able to hold data from multiple applications and is scalable and durable. For example, State store 708, besides historical data, is configured to store present data, information about "future data", and/or data that can be shared across applications such as predictive AI (artificial intelligence).

State cache 706, in one example, is used to provide fast access to commonly requested data stored in state store 708. Note that application can be used by clients. API gateway 712 provides authentication and load balancing. Client request handler 710 leverages state store 708 for providing client data.

In an exemplary embodiment, an onboard GR model is able to handle real-time GR detection based on triggering events. For example, after ML models or GR models for GR detection have been deployed to all or most of the vehicles, the deployed ML models will report to collected data indicating GR system for facilitating issuance of real-time warning for dangerous event(s). The information or data relating to the real-time dangerous event(s) or GR system is stored in state store 708. Vehicles 714 looking for GR detection can, for example, access the GR system using gateway 712.

Figure 8:
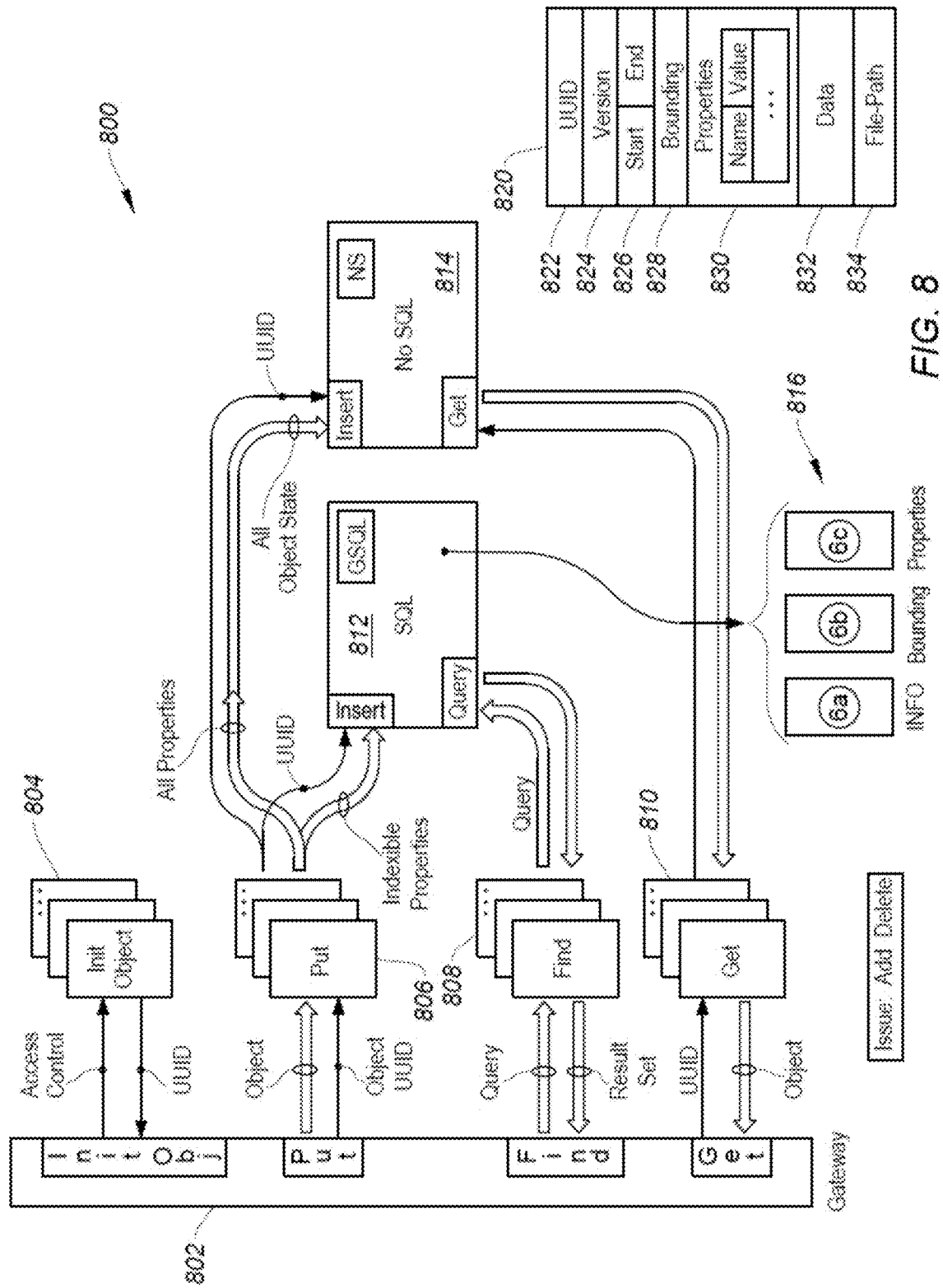
FIG. 8 is a block diagram illustrating a method of storing GR related data using a geo-spatial objective storage in accordance with one embodiment of the present invention.

FIG. 8 is a block diagram 800 illustrating a method of storing GR related data using a geo-spatial objective storage in accordance with one embodiment of the present invention. Diagram 800 includes gateway 802, initial object 804, put call 806, find call 808, get call 810, SQL (Structured Query Language) 812, non-SQL 814, and geo-spatial object storage 820. It should be noted that the underlying concept of the exemplary embodiment(s) of the present invention would not change if one or more blocks (circuit or elements) were added to or removed from FIG. 8.

Geo-spatial object storage 820, in one aspect, stores or holds objects which may include time period, spatial extent, ancillary information, and optional linked file. In one embodiment, geo-spatial object storage 820 includes UUID (universally unique identifier) 822, version 824, start and end time 826, bounding 828, properties 830, data 832, and file-path 834. For example, while UUID 822 identifies an object, all objects have version(s) 824 that allow schema to change in the future. Start and end time 826 indicates an optional time period with a start time and an end time. An optional bounding geometry 828 is used to specify spatial extent of an object. An optional set of properties 830 is used to specify name-value pairs. Data 832 can be binary data. An optional file path 834 may be used to associate with the object of a file containing relevant information such as MPEG (Moving Picture Experts Group) stream.

In one embodiment, API gateway 802 is used to provide access to the service. Before an object can be added to the store, the object is assigned an UUID which is provided by the initial object call. Once UUID is established for a new object, the put call 804 stores the object state. The state is stored durably in Non-SQL store 814 along with UUID. A portion of UUID is used as hash partition for scale-out. The indexible properties includes version, time duration, bounding, and properties which are inserted in a scalable SQL store 812 for indexing. The Non-SQL store 814 is used to contain the full object state. Non-SQL store 814 is scaled-out using UUID as, for example, a partition key.

SQL store 812 is used to create index tables that can be used to perform queries. SQL store 812 may include three tables 816 containing information, bounding, and properties. For example, information holds a primary key, objects void, creation timestamp, state of object and object properties "version" and "time duration." Bounding holds the bounding geometry from the object and the id of the associated information table entry. Properties hold property name/value pairs from the object stored as one name/value pair per row along with ID of associated info table entry.

Find call 808, in one embodiment, accepts a query and returns a result set, and issues a SQL query to SQL store 812 and returns a result set containing UUID that matches the query.

Figure 9:
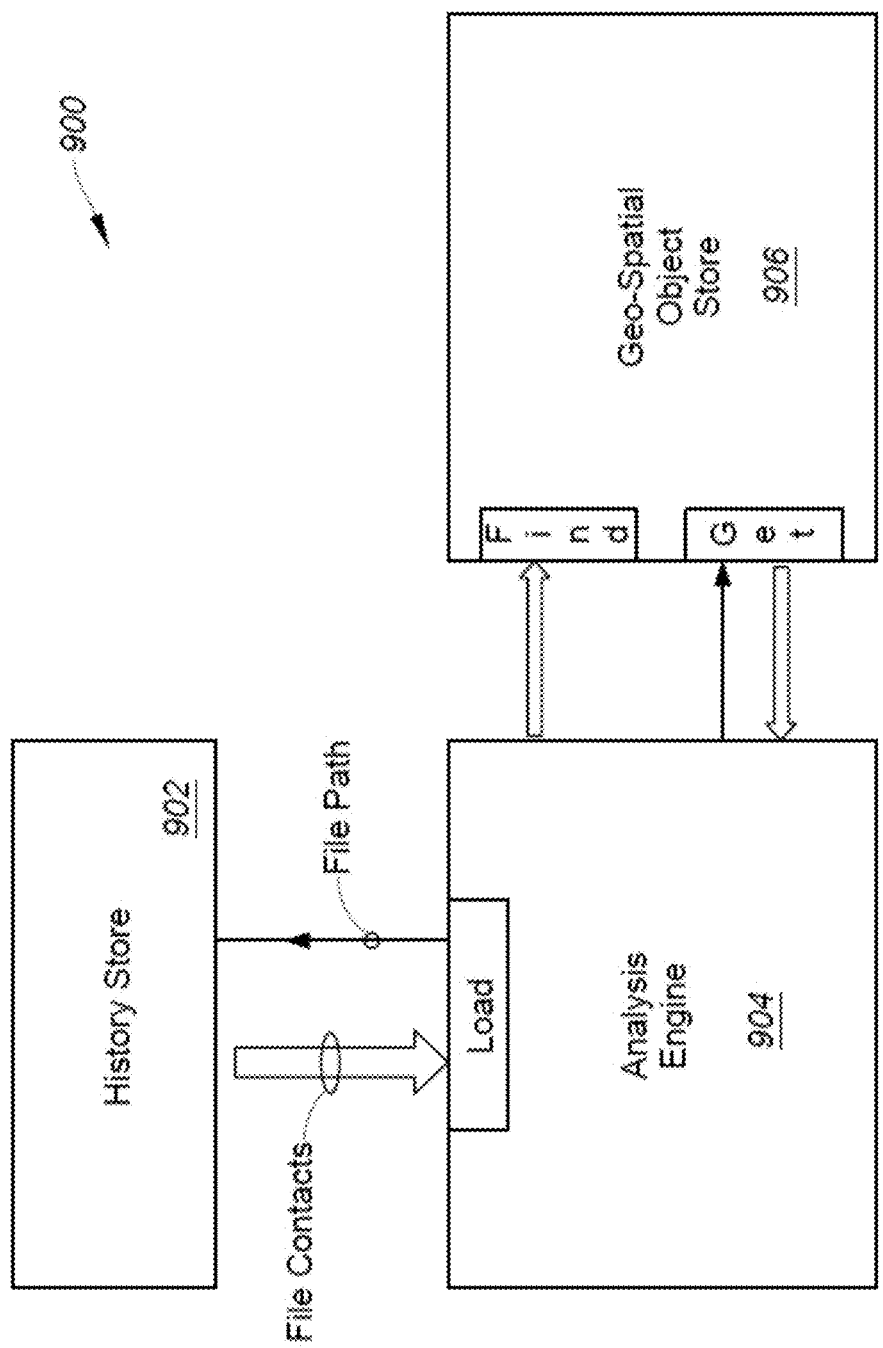
FIG. 9 is a block diagram illustrating an exemplary approach of analysis engine analyzing GR data in accordance with one embodiment of the present invention.

FIG. 9 is a block diagram 900 illustrating an exemplary approach of analysis engine analyzing GR data in accordance with one embodiment of the present invention. Diagram 900 includes history store 902, analysis engine 904, and geo-spatial object store 906. It should be noted that the underlying concept of the exemplary embodiment(s) of the present invention would not change if one or more blocks (circuit or elements) were added to or removed from FIG. 9.

In one aspect, diagram 900 illustrates analysis engine 904 containing ML training component capable of analyzing labeled data based on real-time captured GR data and historical data. The data transformation engine, in one example, interacts with Geo-spatial object store 906 to locate relevant data and with history store to process the data. Optimally, the transformed data may be stored.

It should be noted that virtuous cycle employing ML training component to provide continuous model training using real-time data as well as historical samples, and deliver GR detection model for one or more subscribers. A feature of virtuous cycle is able to continuous training a model and able to provide a real-time or near real-time result. It should be noted that the virtuous cycle is applicable to various other fields, such as, but not limited to, business intelligence, law enforcement, medical services, military applications, and the like.

Figure 10:
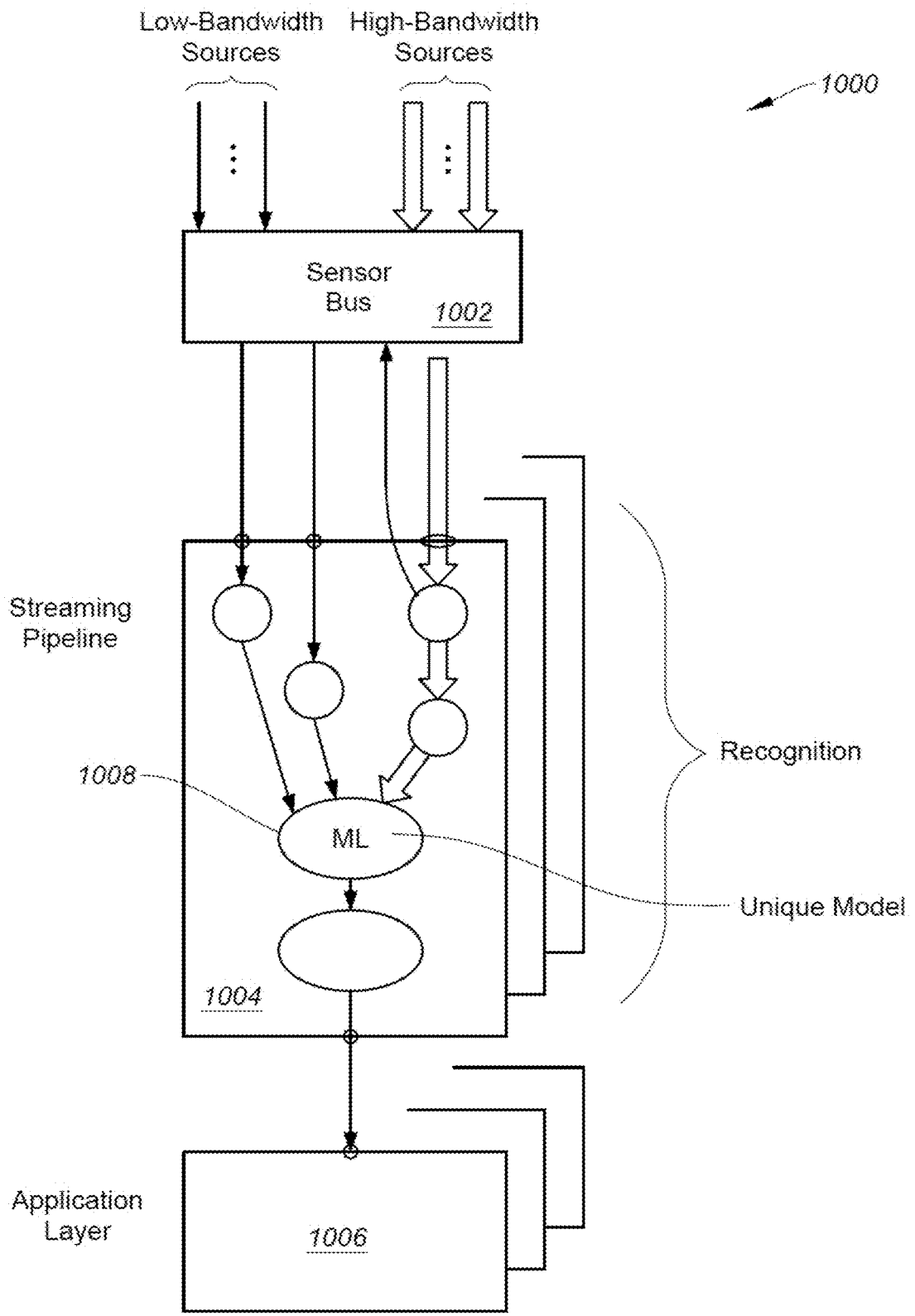
FIG. 10 is a block diagram illustrating an exemplary containerized sensor network used for sensing GR related information in accordance with one embodiment of the present invention.

FIG. 10 is a block diagram 1000 illustrating an exemplary containerized sensor network used for sensing GR system related information in accordance with one embodiment of the present invention. Diagram 1000 includes a sensor bus 1002, streaming pipeline 1004, and application layer 1006 wherein sensor bus 1002 is able to receive low-bandwidth sources and high-bandwidth sources. Streaming pipeline 1004, in one embodiment, includes ML capable of generating unique model such as model 1008. It should be noted that the underlying concept of the exemplary embodiment(s) of the present invention would not change if one or more blocks (circuit or elements) were added to or removed from FIG. 10.

Figure 11:
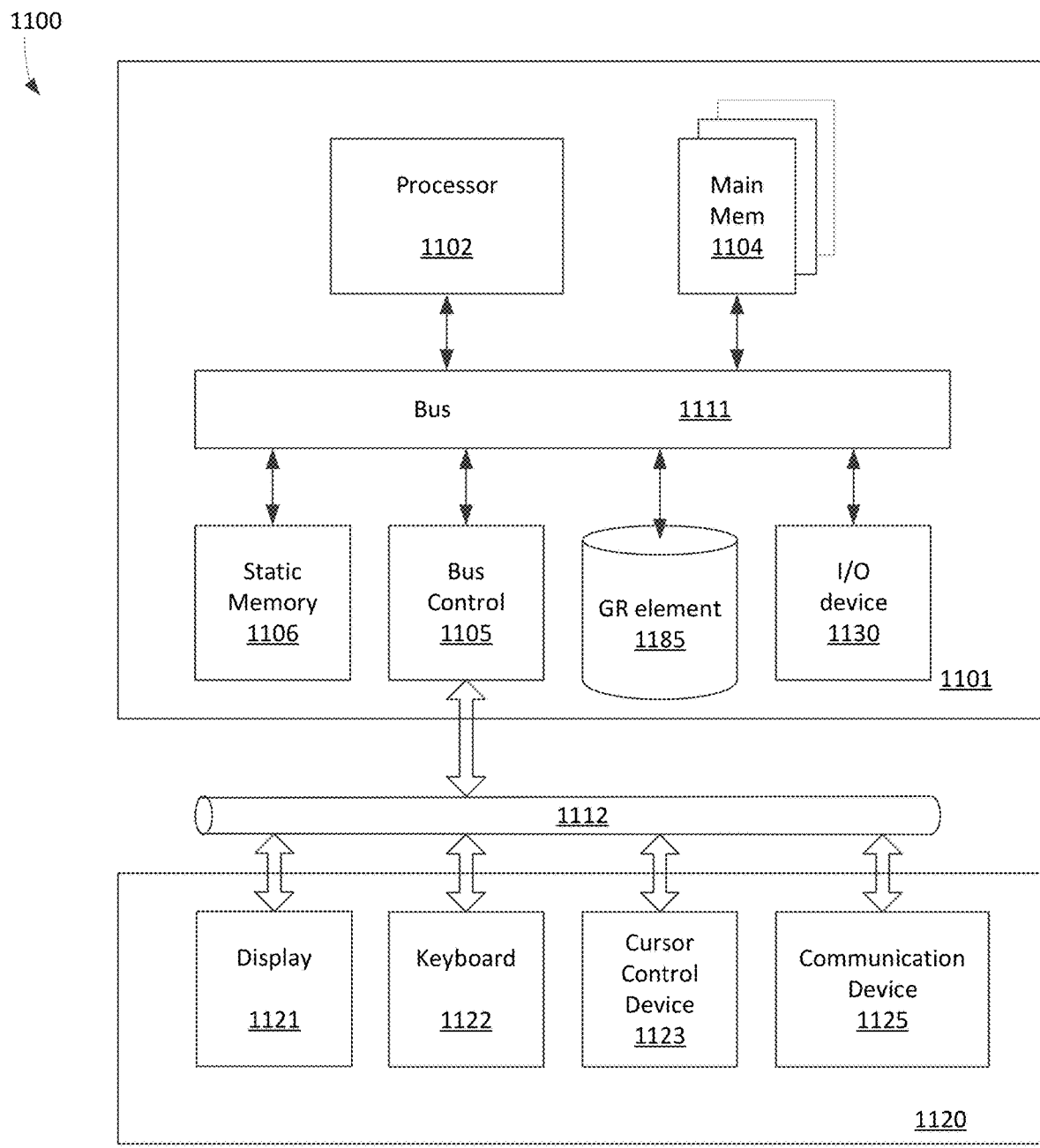
FIG. 11 is a block diagram illustrating a processing device or computer system which can be installed in a vehicle for facilitating the virtuous cycle in accordance with one embodiment of the present invention.

FIG. 11 is a block diagram 1100 illustrating a processing device or computer system which can be installed in a vehicle to support onboard cameras, CAN (Controller Area Network) bus, Inertial Measurement Units, Lidar, et cetera for facilitating virtuous cycle in accordance with one embodiment of the present invention. Computer system or GR system 1100 can include a processing unit 1101, an interface bus 1112, and an input/output ("IO") unit 1120. Processing unit 1101 includes a processor 1102, a main memory 1104, a system bus 1111, a static memory device 1106, a bus control unit 1105, I/O element 1130, and GR element 1185. It should be noted that the underlying concept of the exemplary embodiment(s) of the present invention would not change if one or more blocks (circuit or elements) were added to or removed from FIG. 11.

Bus 1111 is used to transmit information between various components and processor 1102 for data processing. Processor 1102 may be any of a wide variety of general-purpose processors, embedded processors, or microprocessors such as ARM® embedded processors, Intel® Core™ Duo, Core™ Quad, Xeon®, Pentium™ microprocessor, Motorola™ 68040, AMD® family processors, or Power PC™ microprocessor.

Main memory 1104, which may include multiple levels of cache memories, stores frequently used data and instructions. Main memory 1104 may be RAM (random access memory), MRAM (magnetic RAM), or flash memory. Static memory 1106 may be a ROM (read-only memory), which is coupled to bus 1111, for storing static information and/or instructions. Bus control unit 1105 is coupled to buses 1111-1112 and controls which component, such as main memory 1104 or processor 1102, can use the bus. Bus control unit 1105 manages the communications between bus 1111 and bus 1112.

I/O unit 1120, in one embodiment, includes a display 1121, keyboard 1122, cursor control device 1123, and communication device 1125. Display device 1121 may be a liquid crystal device, cathode ray tube ("CRT"), touch-screen display, or other suitable display device. Display 1121 projects or displays images of a graphical planning board. Keyboard 1122 may be a conventional alphanumeric input device for communicating information between computer system 1100 and computer operator(s). Another type of user input device is cursor control device 1123, such as a conventional mouse, touch mouse, trackball, or other type of cursor for communicating information between system 1100 and user(s).

GR element 1185, in one embodiment, is coupled to bus 1111, and configured to interface with the virtuous cycle for facilitating GR performance. For example, if GR system 1100 is installed in a car, GR element 1185 is used to operate the GR model as well as interface with the cloud based network. If GR system 1100 is placed at the cloud based network, GR element 1185 can be configured to handle the correlating process for generating labeled data for GR data.

Communication device 1125 is coupled to bus 1111 for accessing information from remote computers or servers, such as server 104 or other computers, through wide-area network 102. Communication device 1125 may include a modem or a network interface device, or other similar devices that facilitate communication between computer 1100 and the network. Computer system 1100 may be coupled to a number of servers via a network infrastructure such as the Internet.

The exemplary embodiment of the present invention includes various processing steps, which will be described below. The steps of the embodiment may be embodied in machine or computer executable instructions. The instructions can be used to cause a general purpose or special purpose system, which is programmed with the instructions, to perform the steps of the exemplary embodiment of the present invention. Alternatively, the steps of the exemplary embodiment of the present invention may be performed by specific hardware components that contain hard-wired logic for performing the steps, or by any combination of programmed computer components and custom hardware components.

Figure 12:
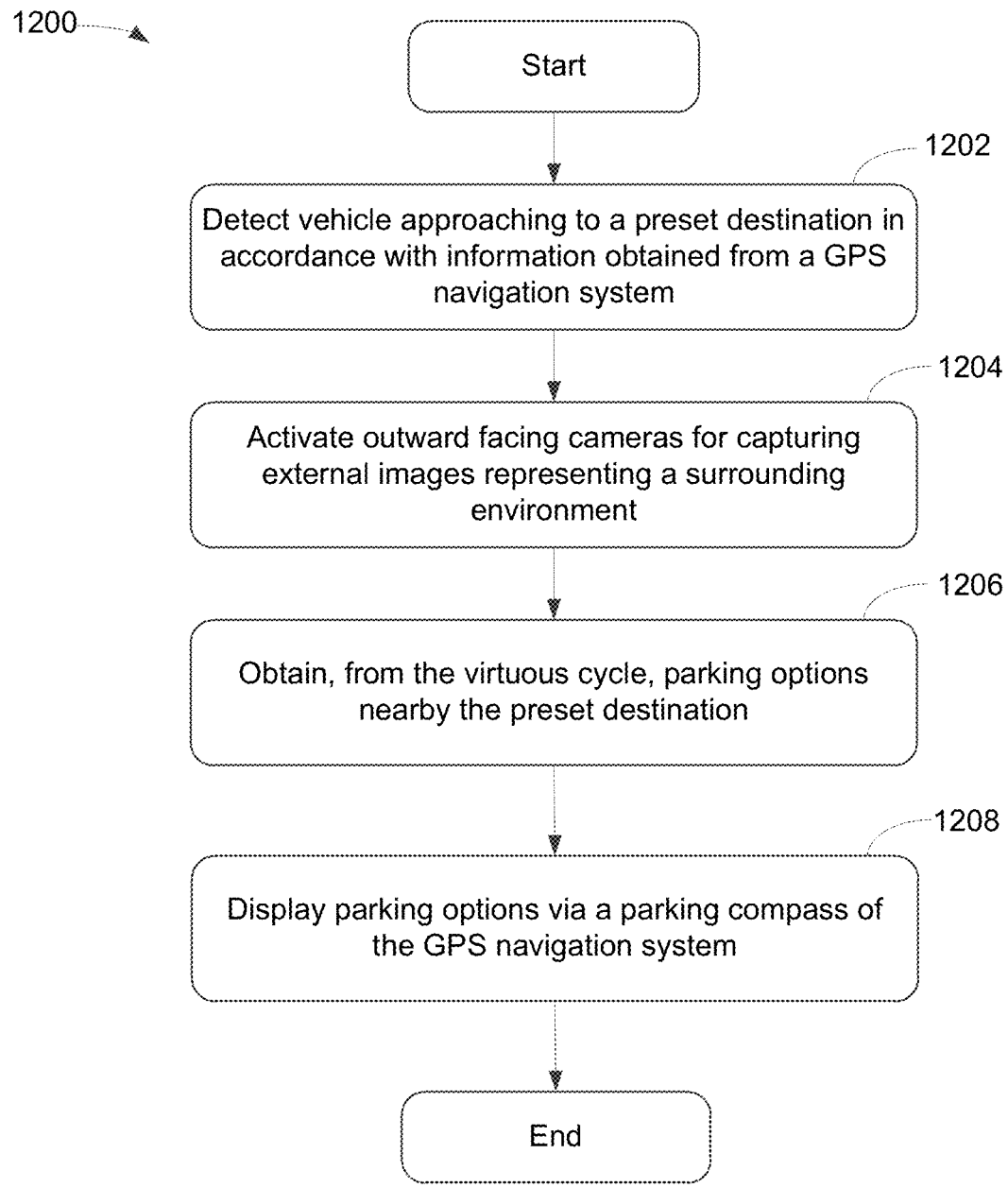
FIG. 12 is a flowchart illustrating a process of GR system capable of providing parking options with refined GPS information in accordance with one embodiment of the present invention.

FIG. 12 is a flowchart 1200 illustrating a process of GR system capable of providing parking options with refined GPS information in accordance with one embodiment of the present invention. At block 1202, a process for goal oriented navigational guidance via metadata extraction utilizing a virtuous cycle including sensors, MLC, and CBN is capable of detecting vehicle approaching to a preset destination in accordance with information obtained from a GPS navigation system. In one example, the process is able to determine whether the preset destination provides parking in accordance with historical data from CBN associated with the preset destination.

At block 1204, the process activates at least a portion of outward facing cameras mounted to the vehicle for capturing external images representing a surrounding environment in which the vehicle operates. In one aspect, audio sensors are activated to record audio data from the surrounding environment in which the vehicle operates.

At block 1206, the process obtains, from the virtuous cycle, information relating to parking options nearby the preset destination in accordance with present time, traffic condition, events, and walking condition. In one example, a suitable parking spot nearby the preset destination is received in accordance with street safety, whether condition, parking pricing, likelihood availability of find a parking, and neighborhood crime rate.

At block 1208, the parking options are displayed via a parking compass of the GPS navigation system to inform driver potential location for parking. In one embodiment, the process is capable of presenting a probability of parking space on the parking compass based on which direction the vehicle turns. In one example, after changing predefined modalities set by the GPS navigation system to proceed looking for a nearby parking space based on direction shown by the parking compass, the GR model connected to the vehicle, MLC, and CBN is activated to generate a search path near the preset destination for parking space. It should be noted that the external images are uploaded from the VOC to the virtuous cycle via a wireless communication network.

While particular embodiments of the present invention have been shown and described, it will be obvious to those of ordinary skills in the art that based upon the teachings herein, changes and modifications may be made without departing from this exemplary embodiment(s) of the present invention and its broader aspects. Therefore, the appended claims are intended to encompass within their scope all such changes and modifications as are within the true spirit and scope of this exemplary embodiment(s) of the present invention.

What is claimed is:

1. A system for refining Global Positioning System ("GPS") navigation guidance for a vehicle, comprising:
    a plurality of outward facing cameras mounted on the vehicle and configured to capture external images representing a surrounding environment in which the vehicle operates, wherein the surrounding environment includes a road upon which the vehicle is operating;
    a vehicle onboard computer ("VOC"), coupled to the plurality of outward facing cameras, configured to:
        analyze the external images to determine an operating lane of the road in which the vehicle is operating;
        analyze the external images to identify at least one reference object;
        obtain a size and location of the at least one reference object from a cloud-based network;
        generate a positional vehicle location with respect to the surrounding environment and the road based on the operating lane of the vehicle and the size and location of the reference object; and
    a GPS refinement ("GR") model coupled to the VOC and configured to:
        generate refined GPS navigation information from a combination of GPS location data and the positional vehicle location; and
        generate a driving guidance based on the refined GPS navigation information.

2. The system of claim 1, wherein the at least one reference object is at a known location.

3. The system of claim 1, wherein the at least one reference object includes a road sign and the location of the road sign is a surveyed position.

4. The system of claim 1, wherein the driving guidance includes an instruction for a driver of the vehicle to change lanes.

5. The system of claim 1, wherein the positional vehicle location is calculated in response to a computation of two optical rays from two external images captured by two different outward facing cameras.

6. The system of claim 1, wherein the VOC generates the positional vehicle location by being further configured to:
    analyze the external images for a plurality of landmarks;
    obtain a size and location of each of the plurality of landmarks;
    determine a distance from the vehicle to each of the plurality of landmarks based on the size of each of the plurality of landmarks and one or more image capture parameters of the plurality of outward facing cameras; and
    determine the positional vehicle location using triangulation between the location of each of the plurality of landmarks and the distance from the vehicle to each of the landmarks.

7. The system of claim 1, wherein the GR model generates the refined GPS navigation information by being further configured to:
    determine a next guidance instruction associated with a next exit of the road for the vehicle to follow to a destination;
    analyze the external images to identify lane information associated with the next exit of the road;
    modify the next guidance instruction based on the lane information and the operating lane of the vehicle; and
    output the next guidance instruction to an operator of the vehicle to change lanes or remain in the operating lane for the next exit.

8. The system of claim 1, wherein the GR model identifies the lane information by being further configured to:
    analyze the external images to detect at least one lane marking on the road.

9. The system of claim 1, GR model identifies the lane information by being further configured to:
    analyze the external images to detect an overhead exit sign with lane markings.

* * * * *